(12) United States Patent
Wang et al.

(10) Patent No.: US 11,900,007 B2
(45) Date of Patent: Feb. 13, 2024

(54) DISPLAY APPARATUS

(71) Applicant: HISENSE VISUAL TECHNOLOGY CO., LTD., Shandong (CN)

(72) Inventors: Haiying Wang, Shandong (CN); Pingguang Lu, Shandong (CN); Shanliang Xu, Shandong (CN); Xianzhuo Sun, Shandong (CN); Yanli Wu, Shandong (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 18/113,913

(22) Filed: Feb. 24, 2023

(65) Prior Publication Data
US 2023/0221917 A1    Jul. 13, 2023

Related U.S. Application Data

(63) Continuation of application No. PCT/CN2021/114444, filed on Aug. 25, 2021.

(30) Foreign Application Priority Data

Aug. 25, 2020 (CN) .......................... 202010862737.X
Aug. 25, 2020 (CN) .......................... 202021793548.3
Nov. 5, 2020 (CN) .......................... 202011226522.5

(51) Int. Cl.
*G06F 3/16* (2006.01)
*H04N 21/4363* (2011.01)
(Continued)

(52) U.S. Cl.
CPC ....... *G06F 3/162* (2013.01); *H04N 21/43635* (2013.01); *H04R 1/025* (2013.01); *H04S 1/007* (2013.01)

(58) Field of Classification Search
CPC .. G06F 3/162; H04N 21/43635; H04R 1/025; H04S 1/007
See application file for complete search history.

(56) References Cited

U.S. PATENT DOCUMENTS

2007/0276524 A1   11/2007   Tokuhara
2009/0027554 A1   1/2009   Noh
(Continued)

FOREIGN PATENT DOCUMENTS

CN   205622849 U   10/2016
CN   108093359 A   5/2018
(Continued)

OTHER PUBLICATIONS

English translation of International Search Report issued in PCT/CN2021/114444, dated Nov. 12, 2021.
(Continued)

*Primary Examiner* — Sejoon Ahn
(74) *Attorney, Agent, or Firm* — Meunier Carlin & Curfman LLC

(57) ABSTRACT

A display apparatus includes: a display; an input interface; and a processor in connection with the display and the input interface and configured to: upon detecting access of a first power amplifier device, output a high-level Hotplug signal at a Hotplug port of the display apparatus; monitor whether a common-mode data packet from the first power amplifier device is received within a first preset duration; in response to the common-mode data packet being received within the first preset duration, send a heartbeat packet to the first power amplifier device, and monitor whether a heartbeat response is received within a second preset duration; in response to the heartbeat response being received within the second preset duration, determine that the first power amplifier device supports e-ARC function; and in response to the heartbeat response being not received within the second
(Continued)

preset duration, determine that the first power amplifier device supports ARC function.

20 Claims, 16 Drawing Sheets

(51) Int. Cl.
*H04R 1/02* (2006.01)
*H04S 1/00* (2006.01)

(56) References Cited

U.S. PATENT DOCUMENTS

| | | | |
|---|---|---|---|
| 2015/0234770 A1 | 8/2015 | Koyanagi | |
| 2018/0288106 A1 | 10/2018 | Ranade et al. | |
| 2019/0147884 A1* | 5/2019 | Hirani | G10L 15/22 704/231 |
| 2019/0149871 A1* | 5/2019 | Yoshizawa | H04N 21/41265 348/734 |
| 2019/0149900 A1* | 5/2019 | Terada | H03G 3/02 381/386 |
| 2019/0149906 A1* | 5/2019 | Rabb | H04W 52/52 381/74 |
| 2019/0149909 A1* | 5/2019 | Größler | H04R 1/2826 381/349 |
| 2020/0351465 A1 | 11/2020 | Wolff et al. | |

FOREIGN PATENT DOCUMENTS

| | | |
|---|---|---|
| CN | 109803170 A | 5/2019 |
| CN | 111492648 A | 8/2020 |
| CN | 111970613 A | 11/2020 |
| CN | 112399217 A | 2/2021 |
| CN | 213339098 U | 6/2021 |
| JP | 2013150079 A | 8/2013 |
| WO | 2019125920 A1 | 6/2019 |

OTHER PUBLICATIONS

English translation of Chinese Office Action issued in CN202011226522.5, dated Mar. 23, 2022.

\* cited by examiner

US 11,900,007 B2

DISPLAY APPARATUS

This application is a continuation application of International Application No. PCT/CN2021/114444, filed on Aug. 25, 2021, which claims priorities to Chinese Patent Application No. 202010862737.X filed on Aug. 25, 2020, Chinese Patent Application No. 202021793548.3 filed on Aug. 25, 2020, and Chinese Patent Application No. 202011226522.5 filed on Nov. 5, 2020, which are hereby incorporated by reference in their entirety.

INVENTION

The disclosure relates to a display apparatus.

BACKGROUND

The display apparatus includes an HDMI ARC (Audio Return Channel) port, and an external speaker that supports ARC may be connected with the display apparatus via the port and HDMI cable. Then the display apparatus may return an audio signal to the external speaker through the sound return technology for signal amplification processing and output. Users are increasingly pursuing more realistic and shocking audio-visual experience, so more and more video content provides sound signals with more directions and more types of channels, to bring the users a sense of immersion and improve the users' audio-visual experience. Here, all different sound signals included in the video content need to be played through loudspeakers arranged at specific positions in the scenario, so the display apparatus achieves a multi-channel sound field effect together with a plurality of external speakers.

SUMMARY

Some embodiments of the disclosure provide a display apparatus, including: a display configured to display an image from a broadcast system or Internet and/or a user interface; an input interface configured to connect with an external device and including a HDMI port, where the external device includes one or more types of power amplifier device; and a processor in connection with the display and the input interface and configured to: upon detecting access of a first power amplifier device, output a high-level Hotplug signal at a Hotplug port of the display apparatus, where the first power amplifier device includes: a power amplifier device that supports e-ARC function or a power amplifier device that supports ARC function; monitor whether a common-mode data packet from the first power amplifier device is received within a first preset duration; in response to the common-mode data packet being received within the first preset duration, send a heartbeat packet to the first power amplifier device, and monitor whether a heartbeat response as a reply to the heartbeat packet sent from the first power amplifier device is received within a second preset duration after sending the heartbeat packet; in response to the heartbeat response from the first power amplifier device being received within the second preset duration, determine that the first power amplifier device is a power amplifier device that supports e-ARC function; and in response to the heartbeat response from the first power amplifier device being not received within the second preset duration, determine that the first power amplifier device is a power amplifier device that supports ARC function.

Some embodiments of the disclosure provide a method for determining a power amplifier device in a display apparatus, including: upon detecting access of a first power amplifier device to the display apparatus, outputting a high-level Hotplug signal at a Hotplug port of the display apparatus, where the first power amplifier device includes: a power amplifier device that supports e-ARC function or a power amplifier device that supports ARC function; monitoring whether a common-mode data packet from the first power amplifier device is received within a first preset duration; in response to the common-mode data packet being received within the first preset duration, sending a heartbeat packet to the first power amplifier device, and monitoring whether a heartbeat response as a reply to the heartbeat packet sent from the first power amplifier device is received within a second preset duration after sending the heartbeat packet; in response to the heartbeat response from the first power amplifier device being received within the second preset duration, determining that the first power amplifier device is a power amplifier device that supports e-ARC function; and in response to the heartbeat response from the first power amplifier device being not received within the second preset duration, determining that the first power amplifier device is a power amplifier device that supports ARC function.

DETAILED DESCRIPTION OF EMBODIMENTS

In order to make the purposes, embodiments and advantages of the disclosure clearer, embodiments of the disclosure will be described clearly and completely below in combination with the accompanying drawings in embodiments of the disclosure. Obviously, the described embodiments are a part of embodiments of the disclosure but not all embodiments.

Based upon embodiments described in the disclosure, all of other embodiments obtained by those ordinary skilled in the art without creative work shall fall within the protection scope of the appended claims of the disclosure. Moreover, although the content disclosed in the disclosure is discussed according to one or more examples, it should be understood that each aspect of the disclosure may also constitute a complete embodiment separately. It should be noted that the brief description of the terms in the disclosure is only for the convenience of understanding embodiments described hereafter, and is not intended to limit embodiments of the disclosure. Unless otherwise specified, these terms should be understood according to the ordinary and plain meanings.

The peripheral output interfaces of the display apparatus platform include: SPDIF (Sony/Philips Digital Interface), HDMI (High Definition Multimedia Interface) and built-in speaker output interface. The HDMI interface includes ARC (Audio Return Channel) function and eARC (Enhanced Audio Return Channel) function, and the built-in speaker output interface includes I2S (Inter-IC Sound, integrated circuit built-in audio bus) and lineout (an analog signal processed by a sound card is output to audio devices such as speaker through the Line Out interface), etc. The signal sources input to the display apparatus include ATV (Asia Television Digital Media Limited), MM (Multi Media), DTV (Digital Video Broadcasting) and so on.

Figure 1:
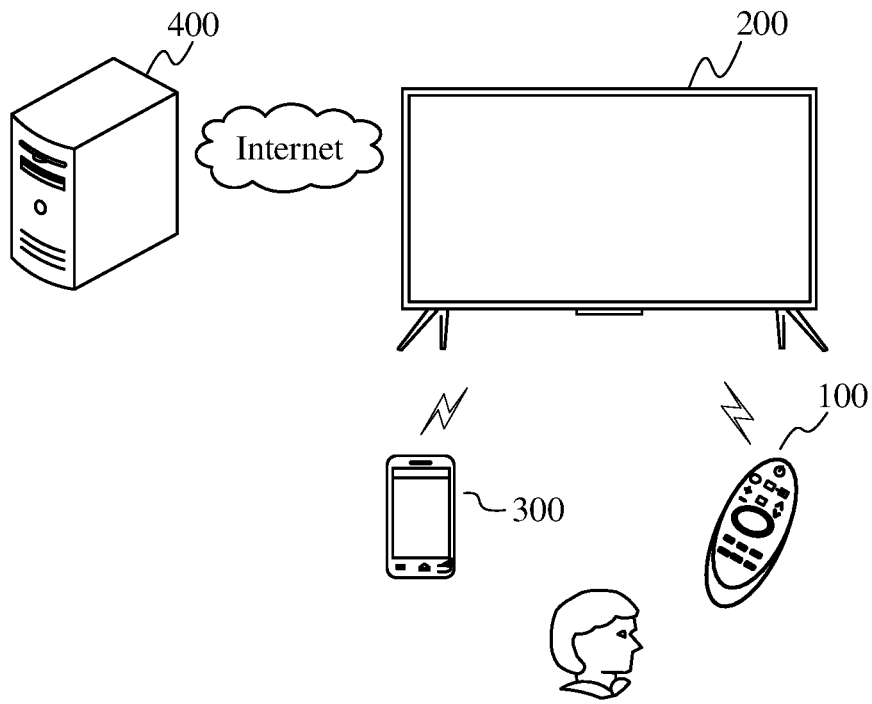
FIG. 1 is a schematic diagram of an operation scenario between a display apparatus and a control device according to one or more embodiments of the disclosure.

FIG. 1 is a schematic diagram of an operation scenario between a display apparatus and a control device according to one or more embodiments of the disclosure. As shown in FIG. 1, a user may operate a display apparatus 200 through a mobile terminal 300 and a control device 100. The control device 100 may be a remote control, and the communication between the remote control and the display apparatus includes infrared protocol communication and Bluetooth protocol communication. The display apparatus 200 is controlled in a wireless or other wired manner. The user may input user commands through keys on the remote processor, voice inputs, control panel inputs, etc. to control the display apparatus 200. In some embodiments, a mobile terminal, a tablet computer, a computer, a laptop and other smart devices may also be used to control the display apparatus 200.

In some embodiments, the mobile terminal 300 and the display apparatus 200 may install software applications, and implement the connection and communication through network communication protocols, achieving the purpose of one-to-one control operation and data communication. Audio and video content displayed on the mobile terminal 300 may also be transmitted to the display apparatus 200 to realize a synchronous display function. The display apparatus 200 also performs data communication with a server 400 in multiple communication manners. The display apparatus 200 may be allowed to perform the communication and connection through a Local Area Network (LAN), a Wireless Local Area Network (WLAN), and other networks. The server 400 may provide various contents and interactions to the display apparatus 200. The display apparatus 200 may be a liquid crystal display, an OLED display, or a projection display apparatus. In addition to a broadcast receiving television function, the display apparatus 200 may additionally provide a smart network television function supported by a computer.

Figure 2:
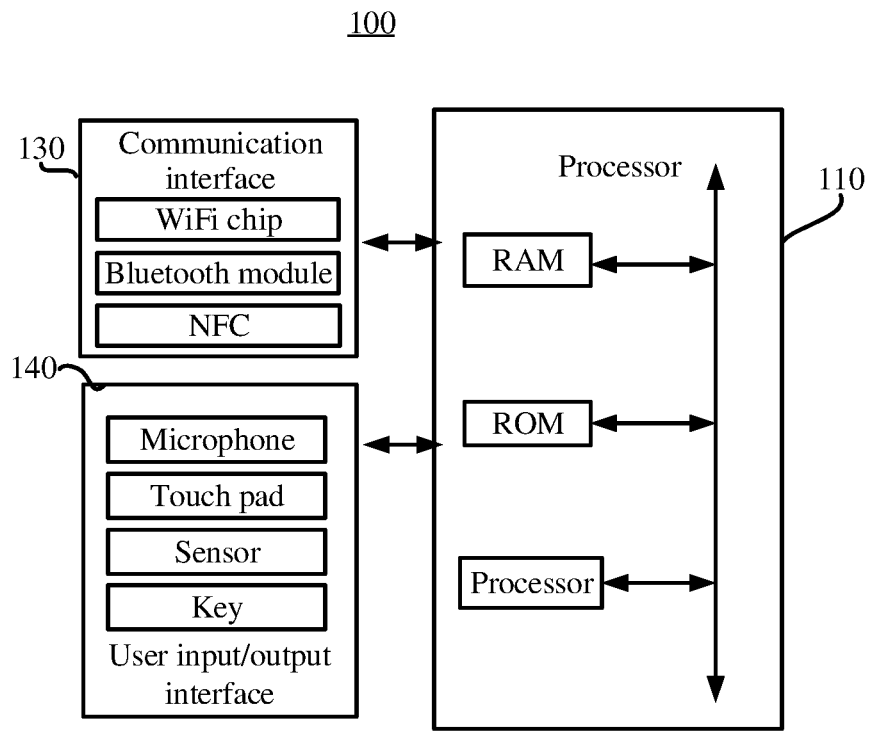
FIG. 2 is a block diagram of a hardware configuration of a control device 100 according to one or more embodiments of the disclosure.

FIG. 2 shows a block diagram of a configuration of a control device 100 according to an embodiment. As shown in FIG. 2, the control device 100 includes a processor 110, a communication interface 130, a user input/output interface 140, a memory, and a power supply. The control device 100 may receive an input operation command from a user and convert the operation command into an instruction that may be recognized and responded by the display apparatus 200, playing an intermediary role between the user and the display apparatus 200. The communication interface 130 is configured to communicate with external parties, via at least one of a WIFI chip, a Bluetooth module, an NFC or an alternative module. The user input/output interface 140 includes at least one of microphone, touchpad, sensor, button or an alternative module.

Figure 3:
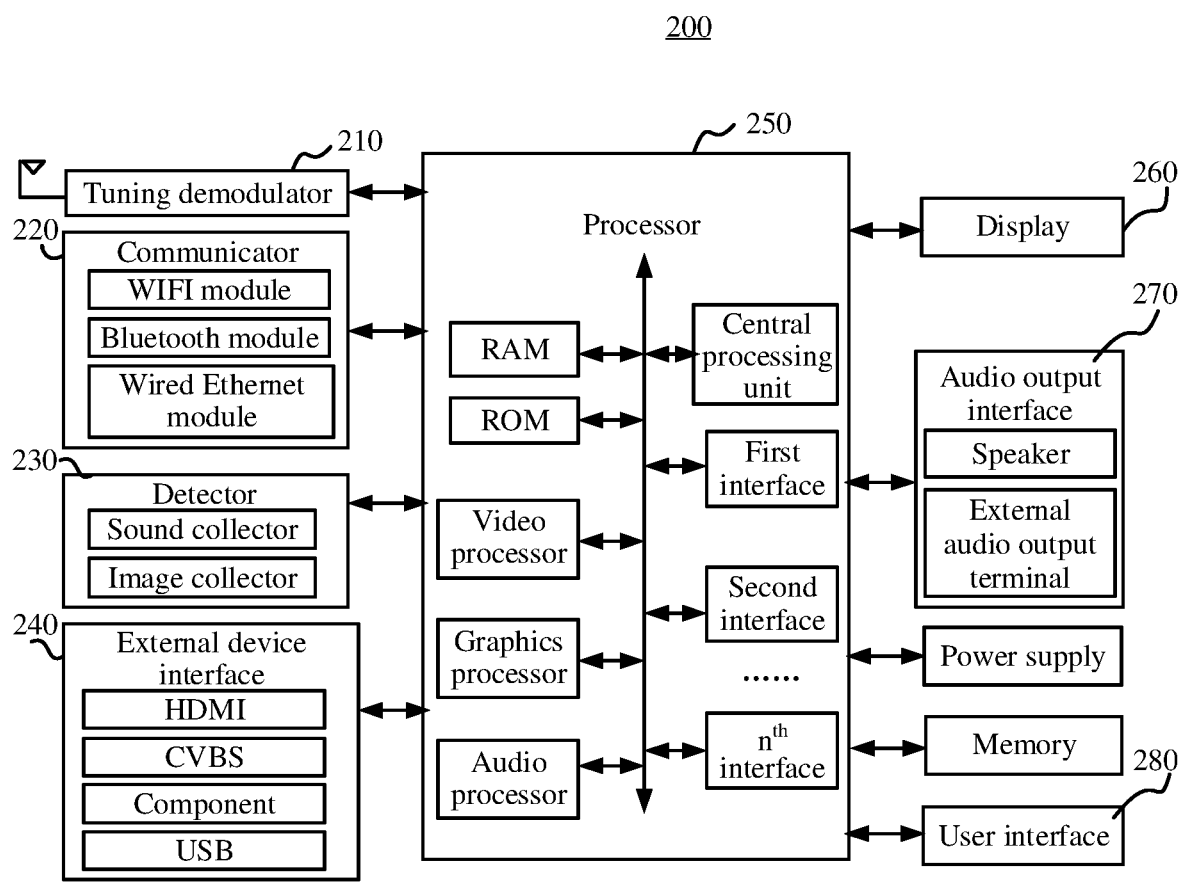
FIG. 3 is a block diagram of a hardware configuration of a display apparatus 200 according to one or more embodiments of the disclosure.

FIG. 3 shows a block diagram of a hardware configuration of a display apparatus 200 according to an embodiment. As shown in FIG. 3, the display apparatus 200 includes at least one of a tuning demodulator 210, a communicator 220, a detector 230, an external device interface 240, a processor 250, a display 260, an audio output interface 270, a memory, a power supply, a user interface 280. The processor includes a central processing unit, a video processor, an audio processor, a graphics processor, an RAM, an ROM, and first to $n^{th}$ interfaces for input/output. The display 260 may be at least one of a liquid crystal display, an OLED display, a touch display or a projection display, and may also be a projection device and a projection screen. The tuning demodulator 210 receives broadcast television signals by a wired or wireless receiving method, and demodulates audio and video signals, such as EPG data signals, from a plurality of wireless or wired broadcast television signals. The detector 230 is used to collect signals from external environment or interact with outside. The processor 250 and the tuning demodulator 210 may be located in different separate devices, that is, the tuning demodulator 210 may also be located in an external device (such as an external set-top box, etc.) of a main device where the processor 250 is located.

In some embodiments, the processor 250 controls operations of the display apparatus and responds to user's operations through various software programs stored in the memory. The processor 250 controls the overall operation of the display apparatus 200. The user may input a user command on the Graphical User Interface (GUI) presented on the display 260, and the user input interface receives the user input command through the Graphical User Interface (GUI). Alternatively, the user may input a user command by inputting a particular sound or gesture, and the user input interface recognizes the sound or gesture through a sensor to receive the user input command.

Figure 4:
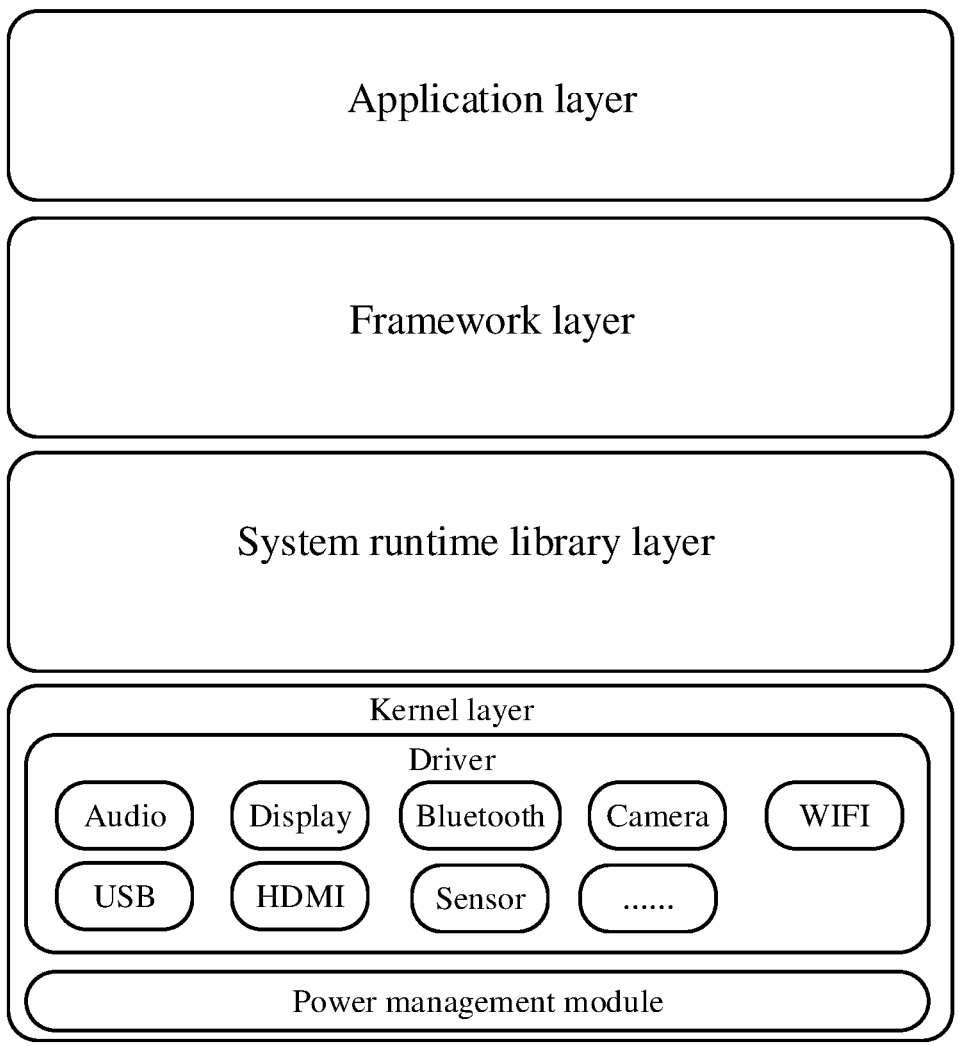
FIG. 4 is a schematic diagram of a software configuration in the display apparatus 200 according to one or more embodiments of the disclosure.

FIG. 4 is a schematic diagram of a software configuration in the display apparatus 200 according to one or more embodiments of the disclosure. As shown in FIG. 4, the system is divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer. The kernel layer at least includes at least one of: audio driver, display driver, Bluetooth driver, camera driver, WIFI driver, USB driver, HDMI driver, sensor driver (such as fingerprint sensor, temperature sensor, pressure sensor, etc.), or power driver, etc.

Figure 5:
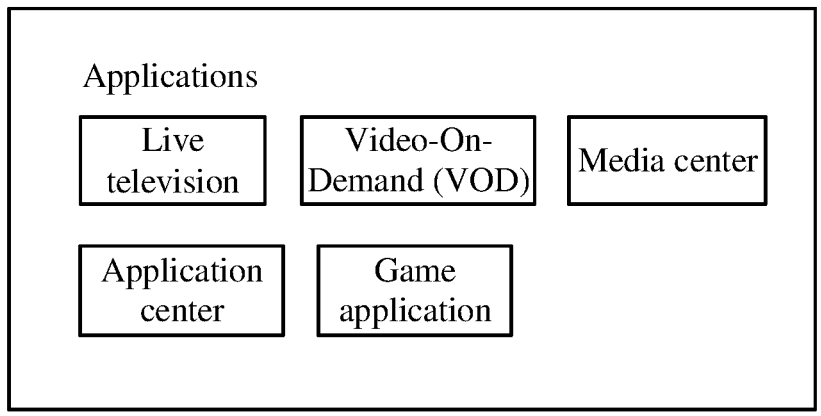
FIG. 5 is a schematic diagram of displaying an icon interface of applications in the display apparatus 200 according to one or more embodiments of the disclosure.

FIG. 5 is a schematic diagram of displaying an icon interface of applications in the display apparatus 200 according to one or more embodiments of the disclosure. As shown in FIG. 5, the application layer includes at least one application whose icon may be presented on the display, such as: icon of live television application, icon of video-on-demand application, icon of media center application, icon of application center, icon of game application, etc. The live television application may provide the live television through different signal sources. The video-on-demand application may provide videos from different storage sources. Unlike the live television application, the video-on-demand application provides the video display from certain storage sources. The media center application may provide various applications playing the multimedia content. The application center may store various applications.

<An External Speaker is Connected with a Display Apparatus Via HDMI>

The ARC function, an audio return function, is a traditional sound return technology standard and protocol specification. The HDMI interface of the display apparatus that supports the ARC function includes a HDMI ARC interface. The power amplifier device that supports the ARC function may be connected with the display apparatus through this interface and the HDMI cable. The HDMI cable is used to connect the ARC-compatible power amplifier device with the ARC-compatible display apparatus. Based on the protocol specification related to ARC, an audio return channel may be established between the display apparatus and the power amplifier device. The audio signal is sent from the display apparatus to the power amplifier device through the established audio return channel, and the audio content from the display apparatus is monitored through the power amplifier device, eliminating the need to use an additional composite audio cable or optical fiber cable.

The eARC function, an enhanced audio return function, is a new generation of sound return technology standard and protocol specification. The ARC and eARC are quite different in terms of hardware and software protocols. The eARC may keep up with changes in audio codecs, particularly including new object-based audio codecs, Dolby Atmos and DTS:X. The eARC significantly increases the bandwidth. Previously one could only use dual-channel PCM (Pulse Code Modulation) or traditional Dolby Digital or DTS audio, but the use of the eARC may now support the audio with higher bandwidth, including Dolby Atmos, DTS:X and other object-based audio with higher bandwidth.

Figure 6:
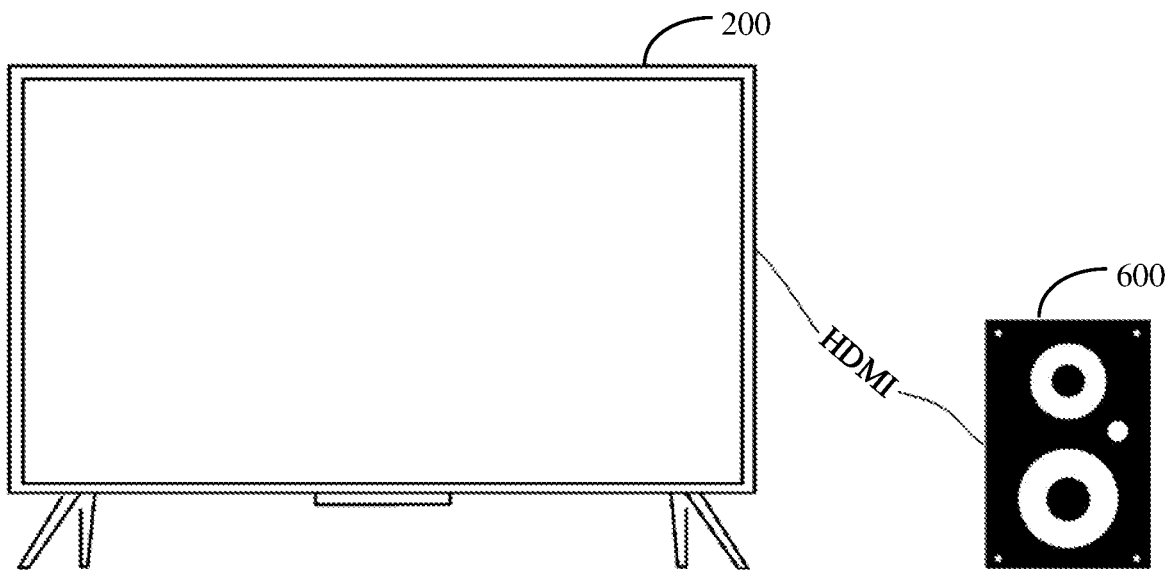
FIG. 6 is a schematic diagram of a scenario where an external speaker is connected with the display apparatus according to one or more embodiments of the disclosure.
Figure 7:
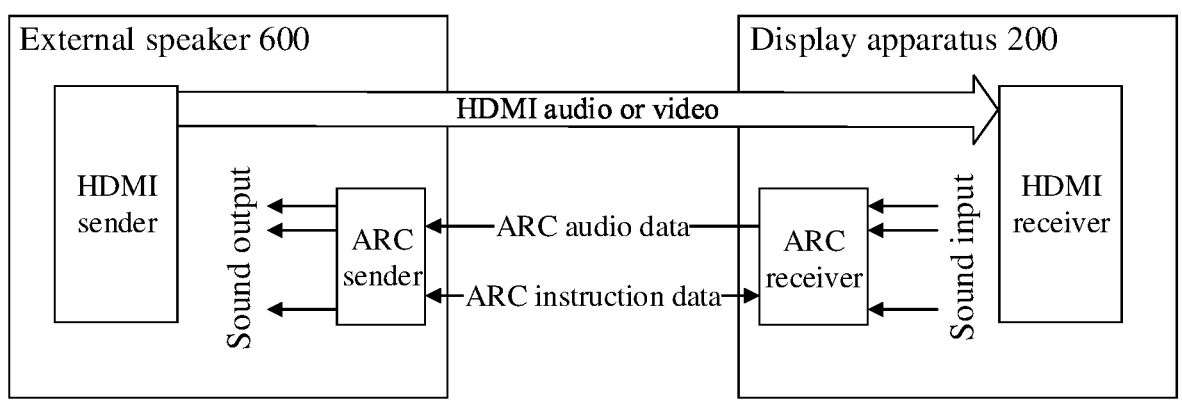
FIG. 7 is a schematic diagram of an ARC connection between the external speaker and the display apparatus according to one or more embodiments of the disclosure.

FIG. 6 is a schematic diagram of a scenario where an external speaker is connected with a display apparatus according to one or more embodiments of the disclosure. As shown in FIG. 6, the external speaker 600 is connected with the display apparatus 200 through an HDMI cable. FIG. 7 is a schematic diagram of an ARC connection between the external speaker and the display apparatus according to one or more embodiments of the disclosure. In an example shown in FIG. 7, the display apparatus 200 and the external speaker 600 support the ARC function. The sound return is accomplished through the Utility signal line, while the interactive instructions between the display apparatus 200 and the external speaker 600 are accomplished through the CEC signal line. In this example, transmission lines of audio data and instruction data are completely separated, and there is no need for time-sharing control by software. Here, the transmission process of the instruction data belongs to the single-wire serial communication, and is called the CEC protocol.

Figure 8:
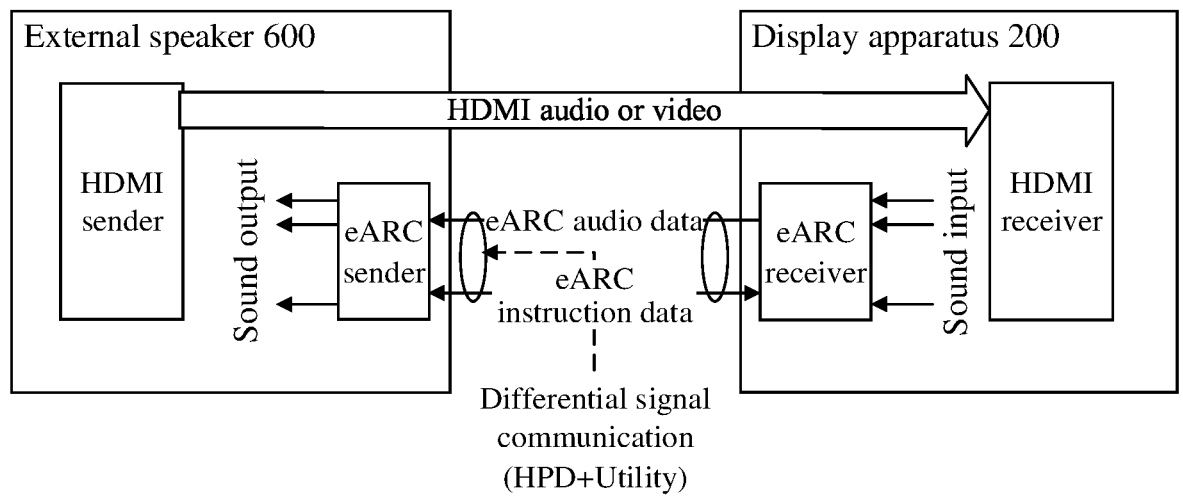
FIG. 8 is a schematic diagram of an eARC connection between the external speaker and the display apparatus according to one or more embodiments of the disclosure.

FIG. 8 is a schematic diagram of an eARC connection between an external speaker and a display apparatus according to one or more embodiments of the disclosure. In an example shown in FIG. 8, the display apparatus 200 and the external speaker 600 support the eARC function. The HPD signal line and the Utility signal line in the HDMI cable are configured as a differential signal pair, and audio data and interactive data are transmitted through time-division multiplexing of the differential pair. In this example, software is required to configure the HPD signal line and the Utility signal line as audio data differential signals when transmitting the audio data, and configure the HPD signal line and Utility signal line as control data differential signals when performing the interactive control, to realize the differential signal communication. The instruction data transmitted during the interactive process is called a common-mode data packet, that is, COMMON Mode Data packet.

In some embodiments, the display apparatus is compatible with both ARC and eARC. That is to say, the external speaker that supports the ARC and the external speaker that supports the eARC may be connected with the display apparatus through the HDMI cable, and complete initialization interaction processes with the display apparatus according to the protocol specification related to ARC or protocol specification related to eARC, and finally establish audio return channels.

In some embodiments, the external speaker that supports the ARC is referred to as an ARC external speaker, and the external speaker that supports the eARC is referred to as an eARC external speaker.

In some embodiments, when the ARC external speaker accesses to the display apparatus, the user requirements to manually set the display apparatus to the ARC interaction mode, so that the display apparatus completes an initial interaction with the accessed ARC external speaker based on the protocol specification related to ARC. When the eARC external speaker accesses to the display apparatus, the user requirements to manually set the display apparatus to the eARC interaction mode, so that the display apparatus completes an initialization interaction with the accessed eARC external speaker based on the protocol specification related to eARC.

In some embodiments, upon detecting access of an external speaker, the processor 250 performs a first initialization process corresponding to the e-ARC external speaker, that is, a initialization process specified in the protocol specification related to eARC function. In the first initialization process, firstly a high-level Hotplug signal is output at the Hotplug port, that is, the level of the Hotplug signal is pulled up, and whether a common-mode data packet sent by the external speaker is received is monitored within a first preset duration when the Hotplug signal level is pulled up. If the accessed external speaker is an e-ARC external speaker, the external speaker may monitor the level state of the Hotplug signal at the Hotplug port of the display apparatus in real time, and may send a common-mode data packet to the display apparatus actively when detecting that the display apparatus outputs a high-level Hotplug signal; if the accessed external speaker is an ARC external speaker, there will be no response after the display apparatus outputs a high-level Hotplug signal.

Therefore, the display apparatus may preliminarily determine whether the accessed external speaker is an eARC external speaker or an ARC external speaker according to whether the common-mode data packet sent by the external speaker is received within the first preset duration. If the display apparatus receives the common-mode data packet within the first preset duration, the display apparatus continues performing the first initialization process. If the display apparatus does not receive the common-mode data packet within the first preset duration, the display apparatus terminates the first initialization process, and starts to perform a second initialization process corresponding to the ARC external speaker, that is, an initialization process specified in the protocol specification related to ARC function.

In some embodiments, the first preset duration may be 20 ms.

In some embodiments, if the common-mode data packet sent by the external speaker is received within the first preset duration, the processor 250 continues performing the first initialization process, which includes: sending a heartbeat packet to the external speaker, and monitoring whether a heartbeat response sent by the external speaker is received within a second preset duration after sending the heartbeat packet; and determining that the external speaker is an e-ARC external speaker if the heartbeat response of the external speaker is received within the second preset duration. In this case, a low-level Hotplug signal is output at the Hotplug port, and the connection with the external speaker is established successfully.

In some embodiments, during the process of continuing performing the first initialization process, if the processor 250 does not receive the heartbeat response sent by the external speaker within the second preset duration after sending the heartbeat packet to the external speaker, the processor 250 determines that the external speaker is not an e-ARC external speaker but an ARC external speaker, so the second initialization process is performed. Here, the second preset duration may be 20 ms.

In some embodiments, the second initialization process performed by the processor 250 may include: pulling down the level of the Hotplug signal at the Hotplug port, and then sending a first instruction to the external speaker, where the first instruction is a request to set the sound system mode for the external speaker, and is used to wake up the external speaker and cause the external speaker to switch to the sound system working mode when the external speaker is in standby state and start the sound system working mode. After receiving the first instruction sent from the display apparatus, the external speaker may start the sound system working mode, and send a first response to the display apparatus, where the first response is a response to setting of the sound system mode. The processor 250 monitors whether the first response sent by the external speaker is received within a third preset duration after sending the first instruction to the external speaker, and sends a second instruction to the external speaker if the first response is received within the third preset duration, where the second instruction is a request for report of completion of the setting of the sound system working mode. After receiving the second instruction sent from the display apparatus, the external speaker may send a second response to the display apparatus, where the second response is a response for indicating completion of setting of the sound system working mode. The processor 250 monitors whether the second response sent by the external speaker is received within a fourth preset duration after sending the second instruction to the external speaker. If the second response returned by the external speaker is received within the fourth preset duration, the communication connection between the display apparatus and the external speaker is established successfully. Here, the third preset duration and the fourth preset duration may be 20 ms.

As can be seen from the above embodiments, when detecting access of an external speaker, a first initialization process corresponding to the e-ARC external speaker is performed, where the first initialization process includes outputting a high-level Hotplug signal and monitoring whether the common-mode data packet sent by the external speaker is received within a first preset duration; if the common-mode data packet is received within the first preset duration, the first initialization process continues being performed to establish a communication connection with the external speaker; if the common-mode data packet is not received within the first preset duration, the first initialization process is terminated, and the second initialization process corresponding to the ARC external speaker is performed to establish a communication connection with the external speaker. As can be seen, no matter whether the accessed external speaker is an ARC external speaker or an e-ARC external speaker, the display apparatus may dynamically switch the initialization process, and finally establish a communication connection with the accessed external speaker without manual settings by the user, improving the user experience.

Figure 9:
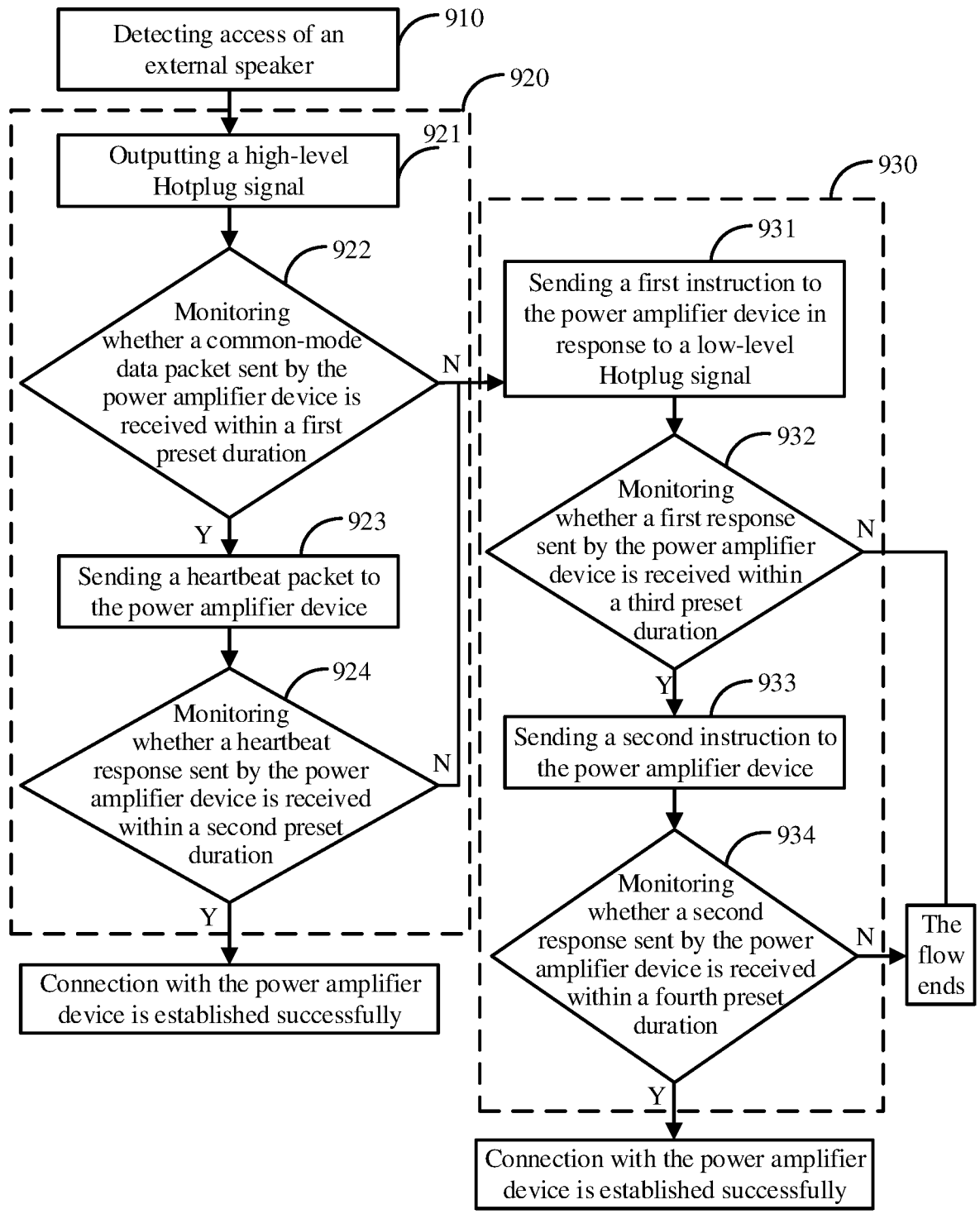
FIG. 9 is a flowchart of a method for establishing a communication connection with an external speaker according to one or more embodiments of the disclosure.

Some embodiments of the disclosure further provide a method for establishing a communication connection with an external speaker, and the method can be applied to the display apparatus 200 in the above embodiments. FIG. 9 is a flowchart of a method for establishing a communication connection with an external speaker according to one or more embodiments of the disclosure. As shown in FIG. 9, the method may include following steps.

Step 910: detecting access of an external speaker.

Step 920: performing a first initialization process corresponding to an e-ARC external speaker, where the first initialization process includes following steps.

Step 921: outputting a high-level Hotplug signal.

Step 922: monitoring whether a common-mode data packet sent by the external speaker is received within a first preset duration; if the common-mode data packet sent by the external speaker is received within the first preset duration, the flow goes to steps 923-924; and if the common-mode data packet sent by the external speaker is not received within the first preset duration, the flow goes to step 930.

Step 923: if the common-mode data packet is received within the first preset duration, continuing performing the first initialization process, that is, sending a heartbeat packet to the external speaker.

Step 924: monitoring whether a heartbeat response sent by the external speaker is received within a second preset duration; if the heartbeat response sent by the external speaker is received within the second preset duration, outputting a low-level Hotplug signal, establishing a connection with the external speaker successfully; if the heartbeat response sent by the external speaker is not received within the second preset duration, the flow goes to step 930.

Step 930: terminating the first initialization process, and performing a second initialization process corresponding to an ARC external speaker.

Here, the second initialization process includes following steps.

Step 931: sending a first instruction to the external speaker in response to a low-level Hotplug signal, where the first instruction is used to wake up the external speaker and enable the external speaker to start the sound system work mode.

Step 932: monitoring whether a first response sent by the external speaker is received within a third preset duration; if the first response sent by the external speaker is received within the third preset duration, the flow goes to step 933; if the first response sent by the external speaker is not received within the third preset duration, the flow ends.

Step 933: sending a second instruction to the external speaker.

Step 934: monitoring whether a second response sent by the external speaker is received within a fourth preset duration; if the second response sent by the external speaker is received within the fourth preset duration, it is determined that the connection with the external speaker is established successfully; if the second response sent by the external speaker is not received within the fourth preset duration, the flow ends.

As can be seen from the above embodiments, when detecting that an external speaker accesses to the display apparatus, the first initialization process corresponding to the e-ARC external speaker is performed, where the first initialization process includes outputting a high-level Hotplug signal and monitoring whether the common-mode data packet sent by the external speaker is received within the first preset duration; if the common-mode data packet is received within the first preset duration, the first initialization process continues being performed to establish a communication connection with the external speaker; if the common-mode data packet is not received within the first preset duration, the first initialization process is terminated, and the second initialization process corresponding to the ARC external speaker is performed to establish a communication connection with the external speaker. As can be seen, no matter whether the accessed external speaker is an ARC external speaker or an e-ARC external speaker, the display apparatus may dynamically switch the initialization process, and finally establish a communication connection with the accessed external speaker without manual settings by the user, improving the user experience.

<External Speakers are Connected with a Display Apparatus Via a Wireless Transmitting Device>

Figure 10:
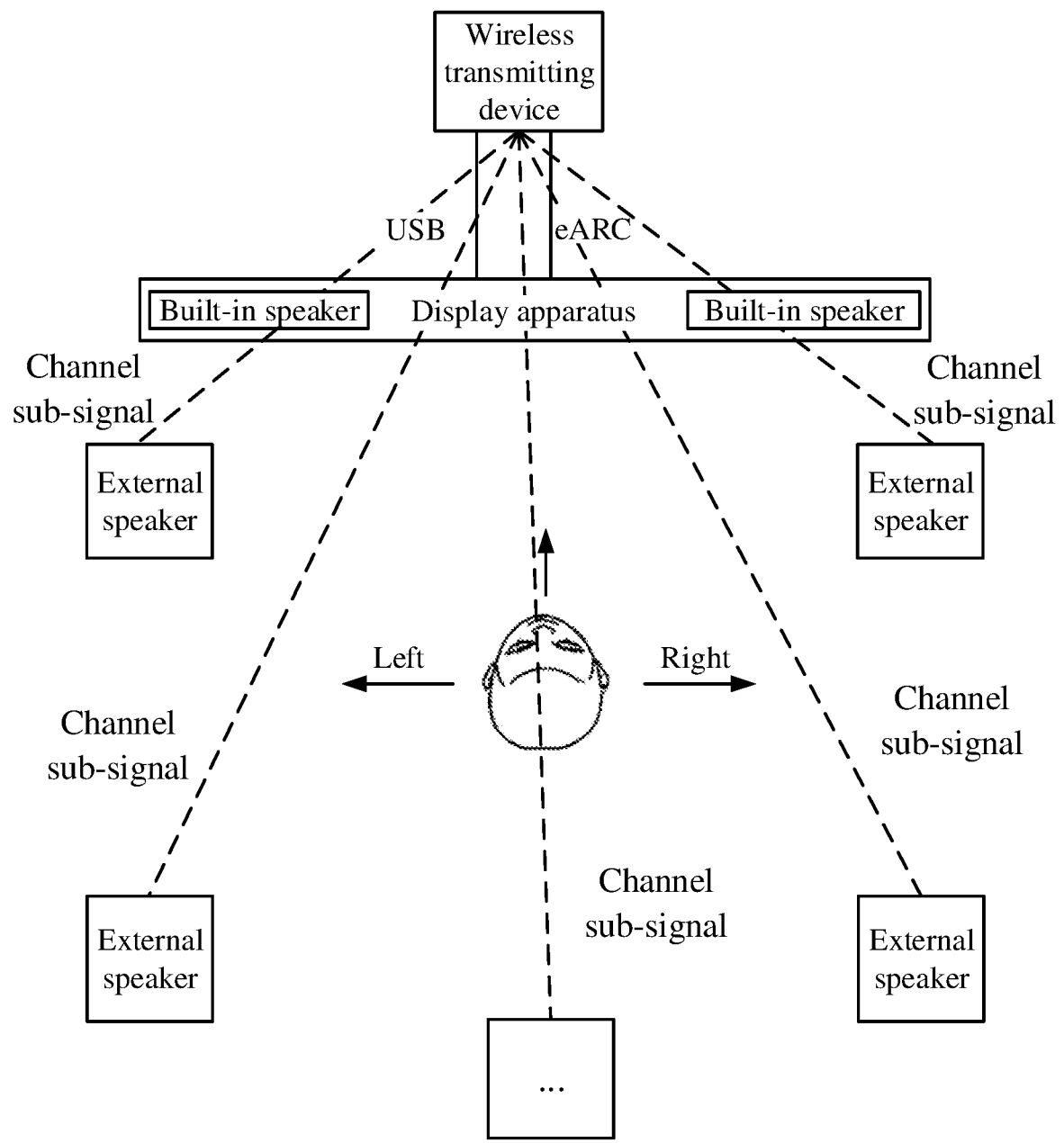
FIG. 10 is an architecture diagram of a processing system according to one or more embodiments of the disclosure.

In some embodiments, FIG. 10 is an architecture diagram of a processing system according to one or more embodiments of the disclosure. Referring to FIG. 10, the processing system may include a display apparatus, a wireless transmitting device, and external speakers. The display apparatus includes a decoder, an audio driver, an audio DSP, a first output terminal and a second output terminal, where the first output terminal may be a USB interface, and the second output terminal may be an HDMI interface or an SPDIF interface. S/PDIF (Sony/Philips Digital Interface) is a type of digital audio interface used in consumer audio equipment to output audio over relatively short distances. The HDMI interface may be an eARC interface. The wireless transmitting device may include a power supply module, a first processing module, a first decoding module, at least one first wireless transceiver module, a first connection terminal and a second connection terminal; where the power supply module is configured to supply power to the first processing module, the first decoding module and each first wireless transceiver module; the first processing module is configured to communicate with the display apparatus to cause the display apparatus to identify access of the wireless transmitting device; the first decoding module is configured to receive a first channel signal sent by the display apparatus, where the first channel signal may be a multi-channel signal output by the HDMI (eARC) interface of the display apparatus or may be an SPDIF output signal output by the SPDIF interface, such as a dual-channel signal; and the first decoding module decodes the first channel signal into two or more channel sub-signals, and for the multi-channel signal, sends some channel sub-signals (some channel sub-signals except for the channel sub-signals that may be played by the built-in speaker) to the external speakers for playback. The display apparatus also includes a built-in speaker, and sends other channel sub-signals to the built-in speaker through an internal I2S interface for playback. The specific distribution of the channel sub-signals may be set according to specific functions of the built-in speaker and the external speakers.

In some embodiments, for the SPDIF output signal, generally only two channels are supported (the rear surround left channel and the rear surround right channel), so the first channel signal includes audio signals of two channels. The first decoding module decodes to obtain the channel sub-signals corresponding to the two channels, and sends the two channel sub-signals to a corresponding external speaker for playback. The other channel sub-signals in the multi-channel signal obtained by the display apparatus through decoding are played back by the built-in speaker of the display apparatus. A first connection terminal of the wireless transmitting device corresponds to the first output terminal, and a second connection terminal of the wireless transmitting device corresponds to the second output terminal. The wireless transmitting device may be connected with the display apparatus through the first connection terminal and the second connection terminal.

The wireless transmitting device of these embodiments allows for expanding the external speaker for the display apparatus without modifying the architecture of the display apparatus, and it also allows for realizing the compatibility with various display apparatus platforms, effectively reducing noise and staccato due to packet loss caused by USB delay timeout in related art.

Figure 11:
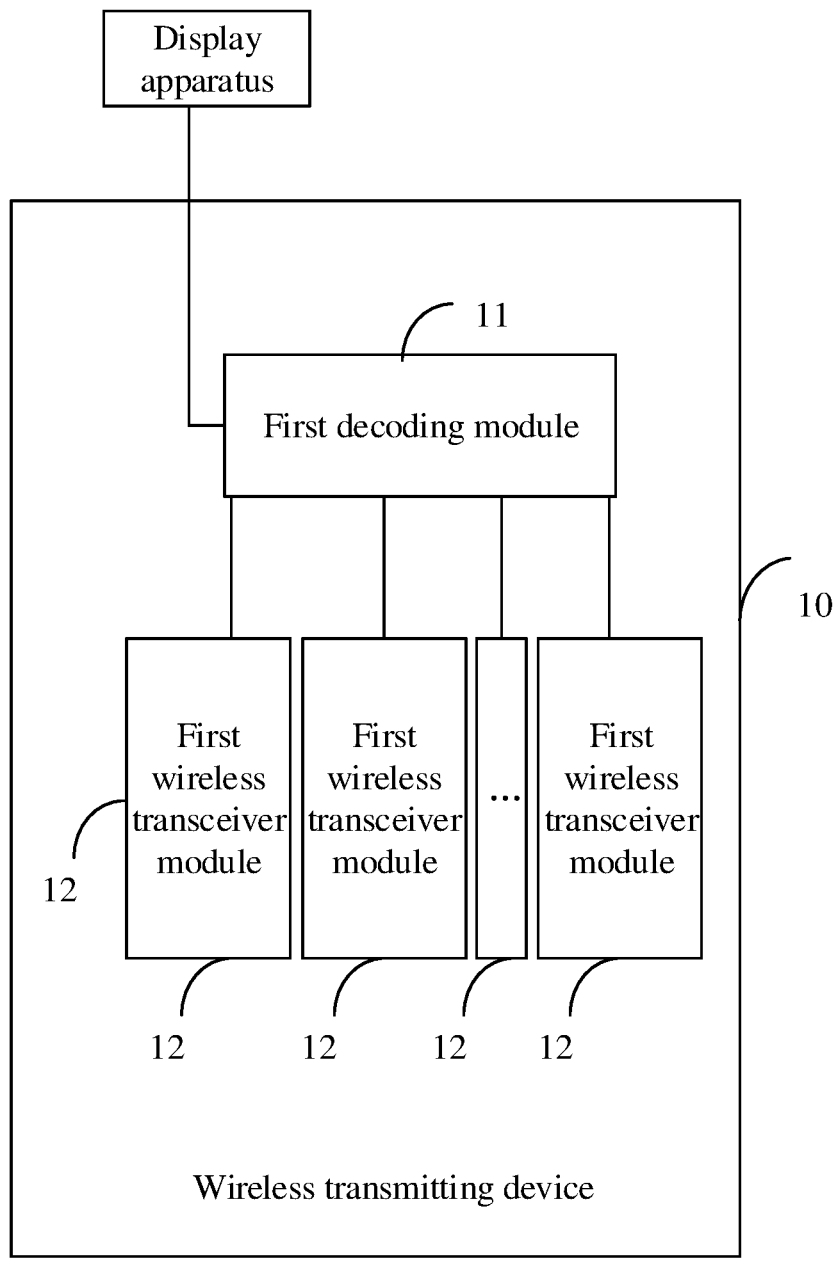
FIGS. 11-12 are structural schematic diagrams of a wireless transmitting device according to one or more embodiments of the disclosure.
Figure 12:
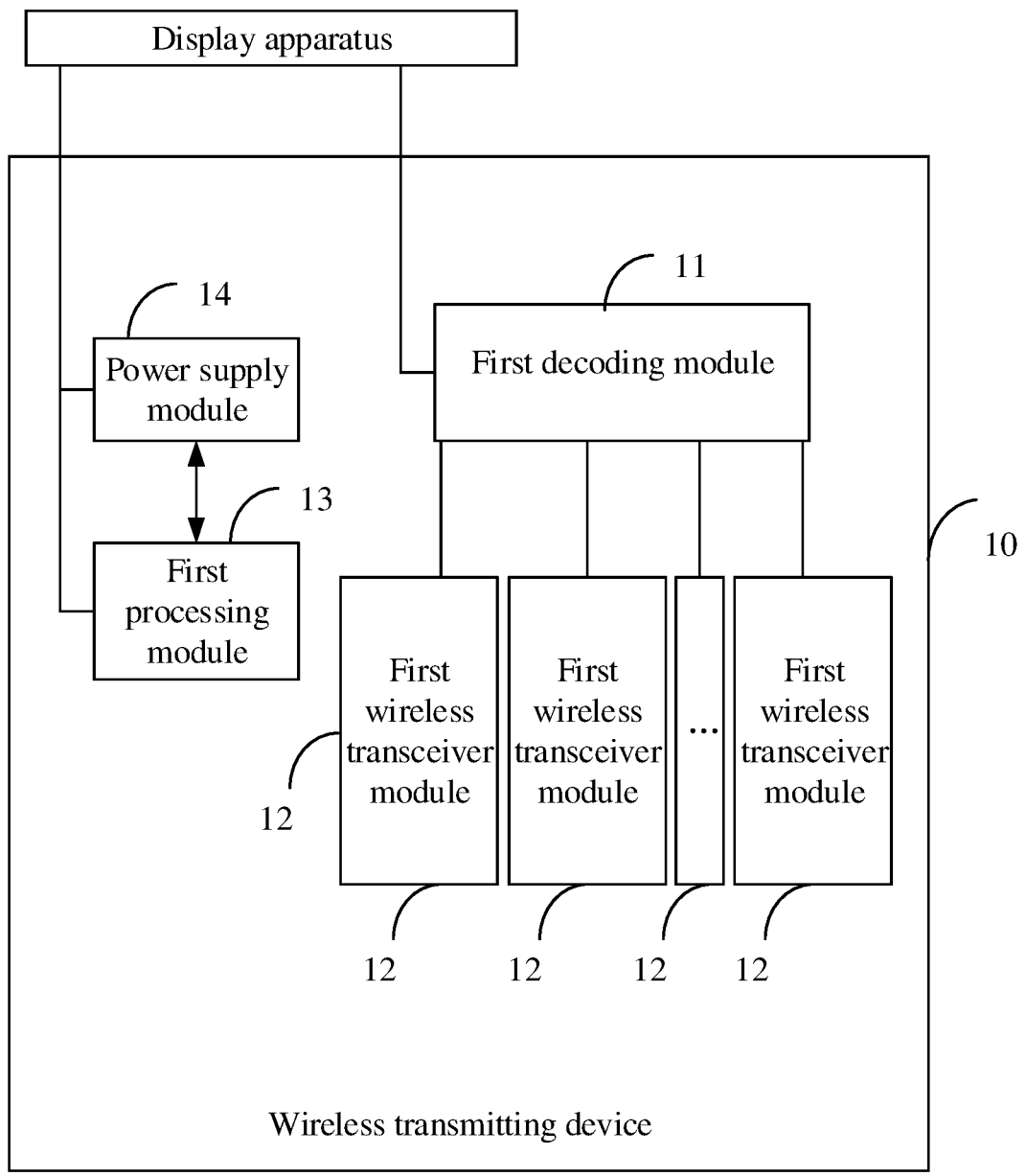

In some embodiments, the wireless transmitting device is configured to expand an external speaker for the display apparatus, to realize the playing effect of surround stereo sound. FIGS. 11-12 are structural schematic diagrams of a wireless transmitting device according to one or more embodiments of the disclosure. Referring to FIG. 11, the wireless transmitting device 10 may include a first decoding module 11 and at least one first wireless transceiver module 12. The first decoding module is configured to decode a first channel signal sent by a display apparatus into channel sub-signals corresponding to channels, distribute the channel sub-signals, and send channel sub-signals required to be played by an external speaker to a corresponding first wireless transceiver module. The first channel signal includes audio signals of two channels. The first wireless transceiver module is configured to send the received channel sub-signals to an external speaker paired therewith, so that the external speaker plays the channel sub-signals.

The first decoding module and the first wireless transceiver module may be powered by an external adapter to work. After the display apparatus determines that a preset type of wireless transmitting device accesses, the working mode is switched to the dual-output signal state (for the case of the output of the eARC interface, each component is switched to the multi-channel mode). The sound signal to be played is decoded into a multi-channel signal, and some channel sub-signals in the multi-channel signal is sent to the corresponding built-in speakers for playback, while the first channel signal is output and sent to the wireless transmitting device through the HDMI (eARC) interface or SPDIF interface. Different interfaces output different first channel signals. The first channel signal output by the eARC interface is a multi-channel signal obtained by the display apparatus through decoding, and the first channel signal output by the SPDIF interface is a dual-channel signal, which may be called SPDIF output signal. The first decoding module receives the first channel signal sent by the display apparatus, decodes the first channel signal into channel sub-signals corresponding to channels, distributes the channel sub-signals, and sends the channel sub-signals required to be played by the external speaker to the corresponding first wireless transceiver module. For different first channel signals, the channel sub-signals are distributed in different ways. For a multi-channel signal, some channel sub-signals are distributed to the external speaker, and other channel sub-signals are distributed to the built-in speaker, so the first decoding module only requires to send some channel sub-signals in the first channel signal to the corresponding first wireless transceiver module, and other channel sub-signals are sent by the display apparatus to the built-in speaker for playback. The SPDIF output signal is a dual-channel signal, and the channel sub-signals corresponding to two channels need to be played by the external speaker, so the first decoding module sends each channel sub-signal in the first channel signal to the corresponding first wireless transceiver module.

In some embodiments, the wireless transmitting device may further include a first processing module configured to communicate with the display apparatus to enable the display apparatus to identify access of the wireless transmitting device.

In some embodiments, the wireless transmitting device may further include a power supply module configured to supply power to the first processing module, the first decoding module and each first wireless transceiver module. The first processing module, the first decoding module and each first wireless transceiver module of the transmitting apparatus may also be powered by a power adapter outside the wireless transmitting device. The specific power supply method may be set according to actual requirements.

Two connection terminals of the wireless transmitting device may be connected with two output terminals of the display apparatus to realize the communication with the display apparatus. The first connection terminal of the wireless transmitting device fits with the first output terminal of the display apparatus, the second connection terminal fits with the second output terminal of the display apparatus, and the wireless transmitting device may be connected with the display apparatus through the first connection terminal and the second connection terminal. The wireless transmitting device takes power from the first output terminal of the display apparatus through the first connection terminal, and converts the power into different voltages to supply power to other modules through the power supply module, and may also communicate with the display apparatus through the first output terminal and report system information of the wireless transmitting device, so that the display apparatus identifies the type of the wireless transmitting device. The wireless transmitting device may also be connected with a peripheral output interface (i.e., the second output terminal) of the display apparatus through the second connection terminal, receive the first channel signal sent by the display apparatus, parse the first channel signal into channel sub-signals corresponding to channels, and send the channel sub-signals that cannot be played by the built-in speaker of the display apparatus to external speakers for playback. The wireless transmitting device works by pairing the first wireless transceiver modules thereof with the external speakers. Each first wireless transceiver module corresponds to one external speaker, and the external speaker may include a power supply, a second processing module, a second wireless transceiver module, an audio amplifier and a loudspeaker. The first processing module in the wireless transmitting device may be a single-chip processor, or one first wireless transceiver module may be used as the first processing module, which may be set according to actual requirements. The second processing module in the external speaker may also be a single-chip processor. The first decoding module may be a decoder, such as an eARC decoder, an SPDIF decoder, or a decoder compatible with a plurality of decoding methods, which may be set according to actual requirements. In some embodiments, the first connection terminal and the first output terminal may be connected according to a serial bus USB protocol. The first connection terminal is set as an interface adapted to a first output terminal of a USB interface, and the first connection terminal is inserted into the first output terminal of the display apparatus; and the second connection terminal may be an interface adapted to a second output terminal of the eARC/SPDIF interface of the display apparatus, and the second connection terminal is inserted into the second output terminal of the display apparatus.

In some embodiments, when the wireless transmitting device is connected with the display apparatus through two terminals, only the first connection terminal may be used for power supply, such as the USB interface of the display apparatus. Although the first connection terminal of the wireless transmitting device is inserted into the USB interface of the display apparatus, the USB interface of the display apparatus is merely used as a power source. The identification of the type of the wireless transmitting device may be: when the HDMI or SPDIF insertion is detected and an unknown type of USB insertion is detected, it is determined that the wireless transmitting device accesses, and the decoder, the audio driver and the like of the display apparatus are set to enable the display apparatus to enter a corresponding working mode.

In some embodiments, the wireless transmitting device may also be connected with the display apparatus through a connection terminal, as follows.

One connection type is to connect the wireless transmitting device with the display apparatus through the HDMI interface without the need to occupy the USB interface of the display apparatus. The power is supplied via an external adapter. In this case, since the first processing module cannot perform the USB communication with the display apparatus, the wireless transmitting device cannot report the system information to the display apparatus, and the type identification of the wireless transmitting device may be performed by the eARC of HDMI. After detecting that a device is inserted at the HDMI port, a handshaking device type is identified according to the handshake protocol related to eARC. In order to distinguish from other general devices, the device type may be customized, for example, different device numbers are respectively defined for a quantity of wireless speakers with different quantities of channels, which may be set according to actual requirements. In the wireless transmitting device, the first decoding module (such as eARC decoding chip) sends device type information to the first processing module after receiving the device type, and the first processing module configures the working mode of the first decoding module and configures the first wireless transceiver module through identification of the pre-stored device type information.

Another connection type is to connect the wireless transmitting device with the display apparatus through the SPDIF interface, where the first channel signal is output through the SPDIF interface, and the SPDIF is output in the PCM format, and the power is supplied by an external power adapter. If the first decoding module (SPDIF decoding chip) or the Soc (main chip) of the display apparatus does not support instruction transmission between each other in this case, only the Soc of the display apparatus may output the PCM signal to the SPDIF decoding chip unidirectionally. In this case, the wireless transmitting device does not communicate with the display apparatus through the USB interface. In order to automatically identify the type of wireless transmitting device and automatically switch the working mode, an option "built-in speaker and external speaker are used as sound output devices at the same time" may be added to a software menu of the display apparatus, which may be implemented by the user's selection.

The display apparatus also includes a built-in speaker. The display apparatus may select other channel sub-signals that may be played by the built-in speaker through the MUX and send these channel sub-signals to the built-in speaker for playback through the internal I2S interface. The specific distribution of the channel sub-signals may be set according to specific functions of the built-in speaker and external speaker, which is not limited in the embodiments of the disclosure.

In some embodiments, the channel type of the display apparatus is 3.1.2, the decoder and DSP configuration of the display apparatus are 5.1.2, built-in speakers of the display apparatus include a left channel speaker and a right channel speaker, and the type of external speakers is 4.1.2, including a left front speaker, a right front speaker, a left rear speaker, a right rear speaker and a subwoofer speaker. Then the built-in speakers of the display apparatus are used as center channel speakers, and the external speakers are configured as: left front speaker=left channel+left height channel, right front speaker=right channel+right height channel, left rear speaker=left rear channel+left height channel, right rear speaker=right rear channel+right height channel, and subwoofer speaker=subwoofer. The above is just an illustrative configuration. According to different functions of the built-in speakers of the display apparatus, different external speakers may be expanded, so that the built-in speakers and the external speakers play together to achieve the desired stereo surround sound effect, which may be set according to actual requirements.

In some embodiments, wireless signals transmitted by the first wireless transceiver module and the second wireless transceiver module include but not limited to signals of: Bluetooth, 2.4G dedicated wireless module, 5.8G dedicated wireless module, UHF wireless module, etc., which may be set according to actual requirements.

It should be noted that both the display apparatus and the external speaker may be existing structural devices, and the display apparatus may be paired with various external speakers by setting the wireless transmitting device. The type and quantity of external speakers are set according to the functions of built-in speakers of the display apparatus and the demands of stereo surround sound. For the display apparatus, the decoder, audio driver, DSP, etc. of the display apparatus may be controlled to work in the corresponding work modes. For example, for the accessed wireless transmitting device of HDMI type, the decoder, audio driver, DSP, etc. of the display apparatus may be controlled to operate in the multi-channel mode and operate in the mode of dual-peripheral output interface, that is, the I2S output interface for connecting the built-in speaker and the HDMI interface for extending the external speaker both output multi-channel signals, so that the built-in speaker and the external speaker may produce sound at the same time, play different channel sub-signals, and collaborate to achieve the stereo surround sound. For the accessed wireless transmitting device of SPDIF type, the decoder, audio driver, DSP, etc. of the display apparatus may be controlled to operate in the corresponding mode of SPDIF and operate in the working mode of dual-peripheral output interface.

In some embodiments of the disclosure, the first decoding module receives the first channel signal sent by the display apparatus and decodes the first channel signal into channel sub-signals corresponding to channels. The channel sub-signals that cannot be played by the display apparatus may be sent to the paired external speaker for playback through the first wireless transceiver module, and the built-in speaker of the display apparatus plays other channel sub-signals, thus realizing the external expansion of the external speaker of the display apparatus. Not only does the architecture of the display apparatus not need to be transformed, but also it may be convenient to realize the compatibility with various display apparatus platforms, effectively mitigating noise and staccato effect due to packet loss caused by USB delay timeout in related technologies.

In some embodiments, FIG. 12 is a further supplementary description of the wireless transmitting device of the embodiment shown in FIG. 11. Referring to FIG. 12, the wireless transmitting device further includes: a first processing module 13, where the first processing module is configured to communicate with the display apparatus to cause the display apparatus to identify access of the wireless transmitting device. The first processing module is connected with the display apparatus through the first connection terminal, and reports system information of the wireless transmitting device, so that the display apparatus may identify the type of the wireless transmitting device. For example, the first processing module is connected with the USB interface of the display apparatus through the first connection terminal, and reports the system information of the wireless transmitting device.

In some embodiments, the wireless transmission device further includes a power supply module 14. The power supply module is configured to supply power to the first processing module, the first decoding module and each first wireless transceiver module.

In some embodiments, the first decoding module includes at least one I2S interface; each I2S interface is connected with one first wireless transceiver module. The first channel signal is a multi-channel signal output by the eARC, and the first decoding module is configured to send a portion of the channel sub-signals corresponding to a plurality of channels to the corresponding first wireless transceiver modules through respective I2S interfaces according to a first distribution manner; or, the first channel signal is an SPDIF output signal, and the first decoding module is configured to send the channel sub-signals corresponding to the channels to the corresponding first wireless transceiver modules through respective I2S interfaces according to a second distribution manner.

The first decoding module is connected with at least one first wireless transceiver module through at least one I2S interface. For example, the first decoding module includes N I2S interfaces and is then connected with N first wireless transceiver modules correspondingly, where each I2S interface is connected with one first wireless transceiver module. For the wireless transmitting device connected with the eARC interface, after decoding to obtain a plurality of channel sub-signals, the first decoding module may distribute a part of the channel sub-signals according to the first distribution manner, and send these channel sub-signals to the corresponding first wireless transceiver modules through respective I2S interfaces. Then the first wireless transceiver module sends the channel sub-signal to the paired external speaker, specifically to the second wireless transceiver module of the paired external speaker, so that the external speaker plays. For the wireless transmitting device connected with the SPDIF interface, after decoding to obtain the channel sub-signals of two channels, the first decoding module may distribute the two channel sub-signals to two corresponding I2S interfaces according to the second distribution manner to send to the corresponding first wireless transceiver modules, and the first wireless transceiver modules then send the two channel sub-signals to the paired external speakers.

FIGS. 13-19 are architecture diagrams of a system comprising a display apparatus and an external wireless speaker according to one or more embodiments of the disclosure.

Figure 13:
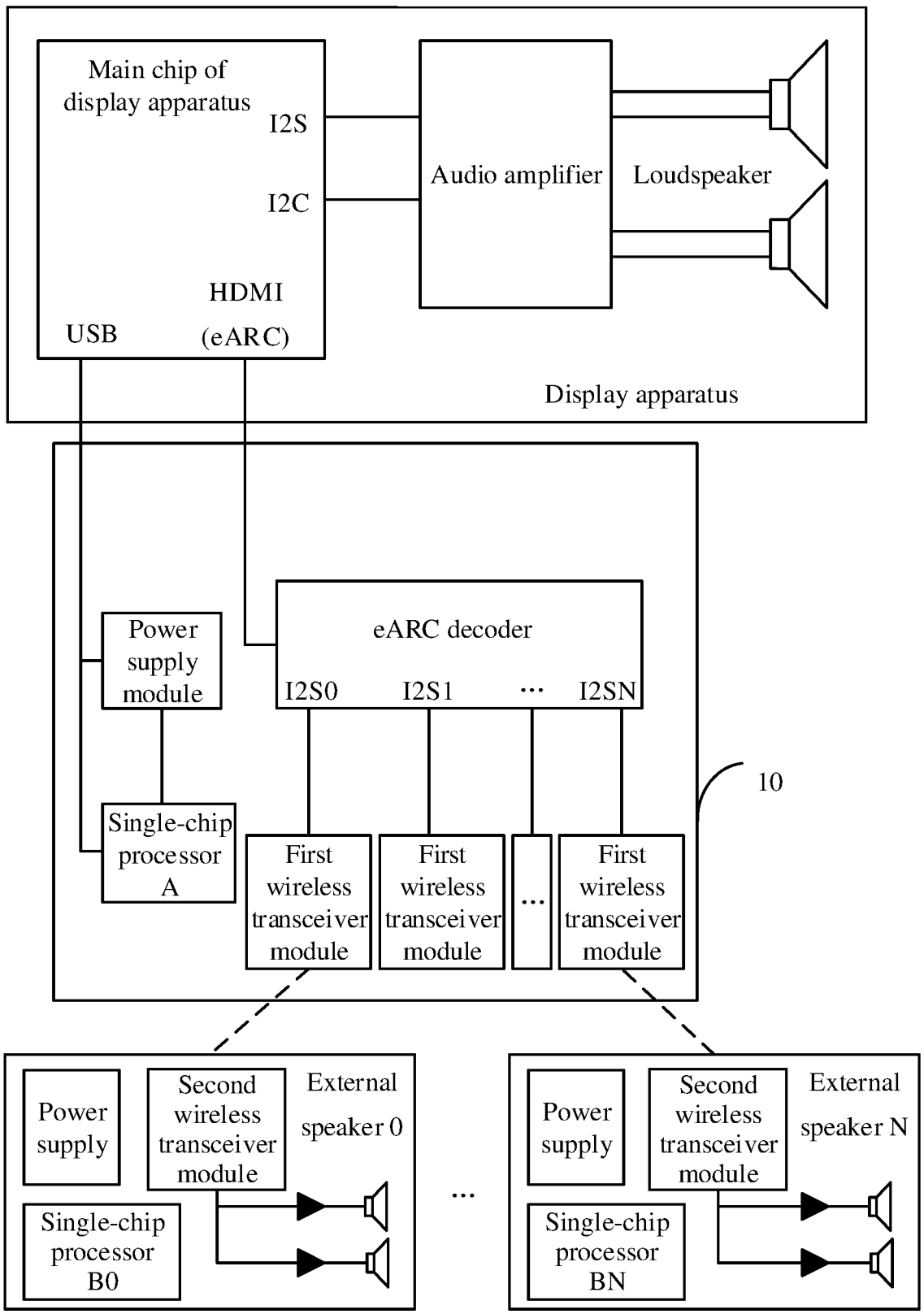
FIGS. 13-19 are architecture diagrams of a system comprising a display apparatus and an external wireless speaker according to one or more embodiments of the disclosure.

In some embodiments, as shown in FIG. 13, the first decoding module is an eARC decoder, and the eARC decoder receives a multi-channel signal sent by the display apparatus. a 5.1.2-channel signal is taken as an example of multi-channel signal, and the eARC decoder decodes the 5.1.2-channel signal into 8 independent digital audio signals, that is, channel sub-signals corresponding to 8 channels, which are left, right, center, left rear surround, right rear surround, subwoofer, left height and right height channels respectively. The built-in speakers of the display apparatus include a left channel speaker and a right channel speaker. The built-in speakers of the display apparatus may play the center channel, that is, both the left speaker and the right speaker play the signal of the center channel. Then the channel sub-signals of 7 remaining channels cannot be played by the built-in speakers and need to be played by external speakers. The eARC decoder of the wireless transmitting device may redistribute 7 channel sub-signals according to a preset distribution manner, which may be: left and left height are output by I2S0, right and right height are output by I2S1, left rear surround and left height are output by I2S2, right rear surround and right height are output by I2S3, and subwoofer are output by I2S4. The eARC decoder sends the corresponding channel sub-signals to the corresponding first wireless transceiver modules through the corresponding I2S interfaces, and then the first wireless transceiver modules send these channel sub-signals to respective external speakers for playback.

Figure 14:
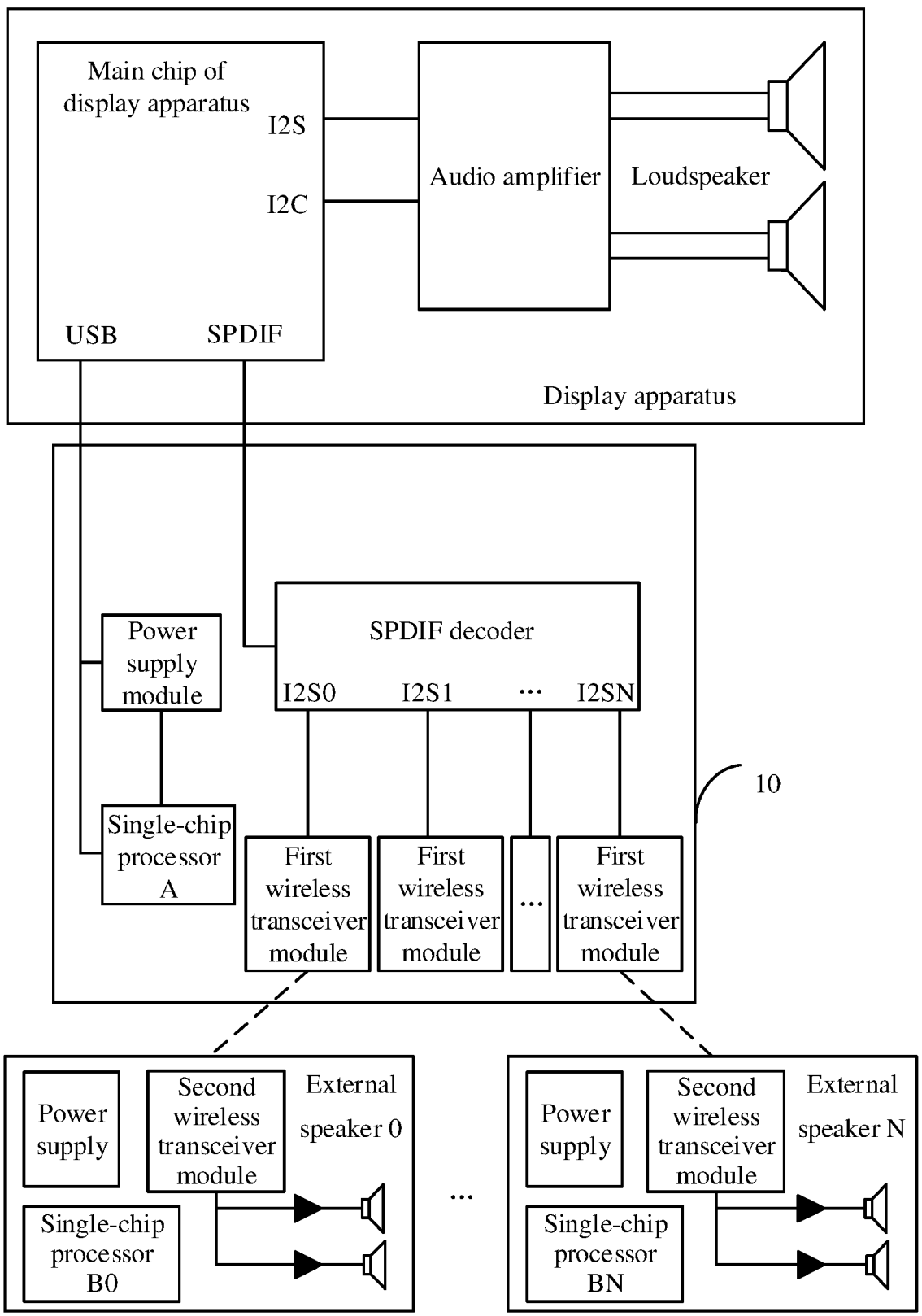

In some embodiments, as shown in FIG. 14, the first decoding module is an SPDIF decoder that receives an SPDIF output signal sent by the display apparatus, decodes to obtain channel sub-signals corresponding the rear surround left channel and the rear surround right channel, and sends the channel sub-signals to the corresponding first wireless transceiver modules through the corresponding I2S interfaces. The first wireless transceiver modules send the channel sub-signals to the corresponding external speakers for playback. The pairing operation between the first wireless transceiver module in the wireless transmitting device and the second wireless transceiver module in the external speaker and the transmission of audio signals can refer to related technologies, and will omit here.

In some embodiments, the first processing module is further configured to control the decoding manner of the first decoding module and the distribution manner of the channel sub-signals. The first decoding module is configured to decode the first channel signal sent by the display apparatus into channel sub-signals corresponding to channels according to the decoding manner indicated by the first processing module, and distribute the channel sub-signals according to the preset distribution manner indicated by the first processing module.

The first processing module may be implemented by a single-chip processor. Since the first wireless transceiver module also has a simple control function, the first processing module may also be implemented by one first wireless transceiver module, which may be set according to actual requirements. The decoding manner of the first decoding module and the distribution manner of the channel sub-signals may be preset in the first processing module. When the wireless transmitting device works, the first processing module carries the decoding manner in an instruction and sends the instruction to the first decoding module, so that the first decoding module decodes according to the decoding manner indicated by the first processing module, and distributes the channel sub-signals according to the distribution manner indicated by the first processing module. In some embodiments, the first decoding module may be compatible with many kinds of decoders, such as eARC decoder and SPDIF decoder. Then, when the wireless transmitting device works, the decoding manner may be determined according to the type of the interface actually connected with the display apparatus, and the decoding manner of the first decoding module is determined. That is, the display apparatus may send a multi-channel signal to the wireless transmitting device through the eARC interface, or send a two-channel signal to the wireless transmitting device through the SPDIF interface, which may be set according to actual requirements.

In some embodiments, the first processing module is further configured to control the working mode of each first wireless transceiver module. The working mode includes at least one of pairing of the first wireless transceiver module and the second wireless transceiver module in the speaker, the signal transmitting and receiving mode, the work frequency, the delay management, etc.

In some embodiments, the wireless transmitting device further includes: a first connection terminal and a second connection terminal. The first connection terminal is configured such that the power supply module and the first processing module are connected with the first output terminal of the display apparatus through the first connection terminal when the first connection terminal is inserted into the display apparatus. The second connection terminal is configured such that the first decoding module is connected with the second output terminal of the display apparatus through the second connection terminal when the second connection terminal is inserted into the display apparatus. The first connection terminal is used for the power supply module to take power and the first processing module to report the system information, and the second connection terminal is used for the first decoding module to receive the multi-channel signal sent by the display apparatus.

In some embodiments, the first connection terminal is a USB interface, the second connection terminal is an eARC interface, and the access of the wireless transmitting device to the display apparatus includes: insertion of the first connection terminal into the USB interface of the display apparatus, and insertion of the second connection terminal into the eARC interface of the display apparatus. The access of the wireless transmitting device is realized through two interfaces, which is convenient for the display apparatus to identify the type of the wireless transmitting device and control the corresponding working mode of the display apparatus.

In some embodiments, the insertion sequence of the first connection terminal and the second connection terminal varies, and the corresponding processing process of the display apparatus varies. Two insertion sequences may be included. The following still takes the USB interface and the eARC interface as an example (the SPDIF interface is similar and will not be described in detail herein).

1. The eARC interface is inserted firstly, and then the USB interface is inserted. When the eARC interface is inserted firstly, the dongle circuit (that is, the wireless transmitting device) is not powered, so the eARC decoder is in an unloaded state, and the Soc of the display apparatus may not identify the insertion of the dongle. When the USB interface is inserted, the dongle circuit is powered, the eARC decoder and the single-chip processor (the first processing module) are both in the working state, and the Soc of the display apparatus may identify the insertion of the wireless transmitting device.

2. The USB interface is inserted firstly, and in this case, the single-chip processor may work, and the display apparatus identifies the access of the dongle. The Soc of the display apparatus may wait for the insertion of the eARC interface, and start to enter the multi-channel mode after the eARC interface is inserted.

As another implementation, in some embodiments, the wireless transmitting device may be connected with the display apparatus through only one connection terminal, for example, connected with the display apparatus through only the second connection terminal. The first connection terminal may be connected with an external power adapter, and supply power to each part of the wireless transmitting device through the external power adapter.

Figure 15:
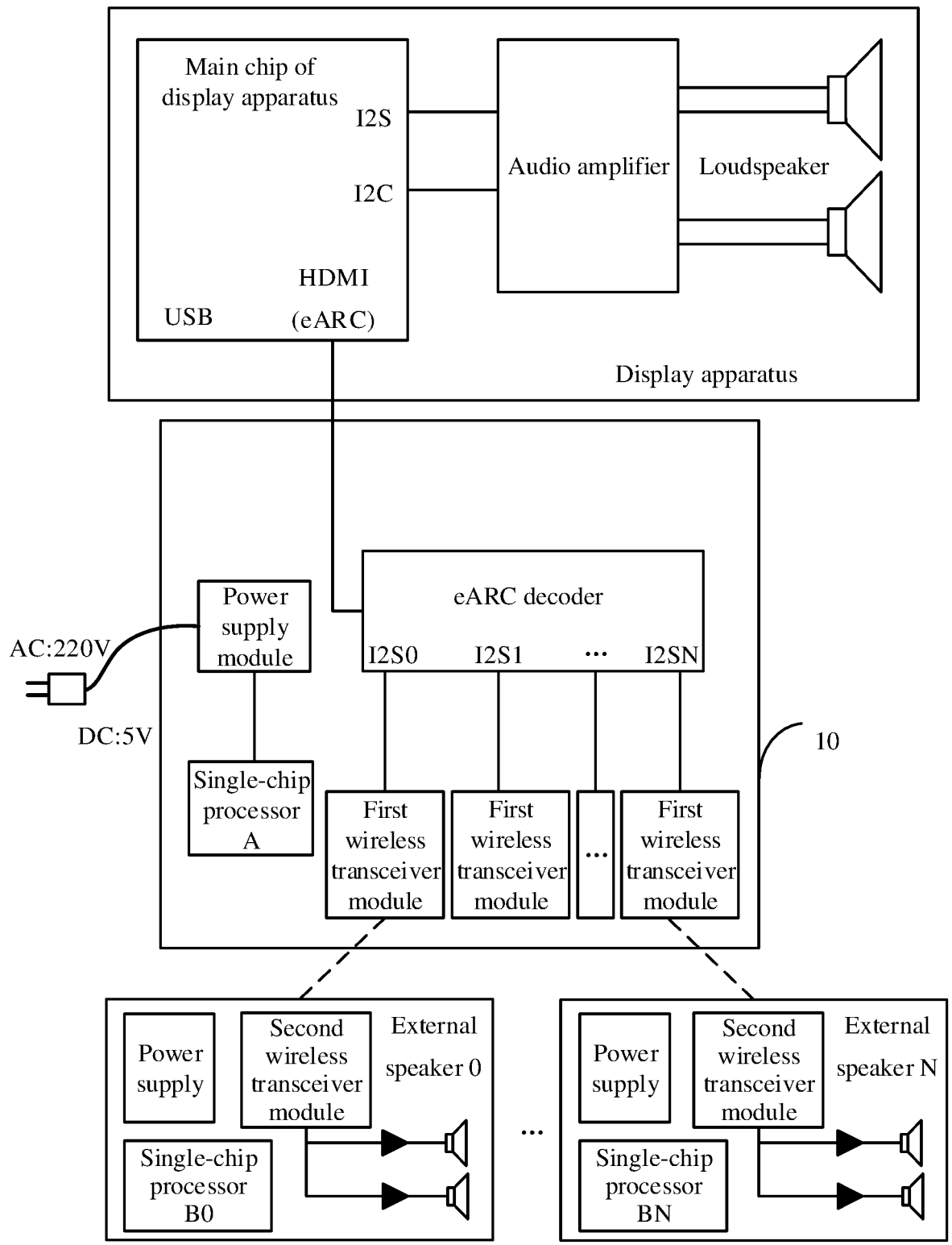

In some embodiments, as shown in FIG. 15, the first decoding module is an eARC decoder. Since the first processing module cannot perform the USB communication with the display apparatus, the wireless transmitting device cannot report the system information to the display apparatus, and the type identification of the wireless transmitting device may be performed by the eARC of HDMI. After detecting insertion of a device via the HDMI port, the handshaking device type is identified according to the handshake protocol related to eARC. In order to distinguish from other general devices, the device type may be customized, for example, different device numbers are respectively defined for a quantity of wireless speakers with different quantities of channels, which may be set according to actual requirements. In the wireless transmitting device, the first decoding module (such as eARC decoding chip) sends the device type information to the first processing module after receiving the device type, and the first processing module configures the working mode of the first decoding module and configures the first wireless transceiver module through identification of the pre-stored device type information.

Figure 16:
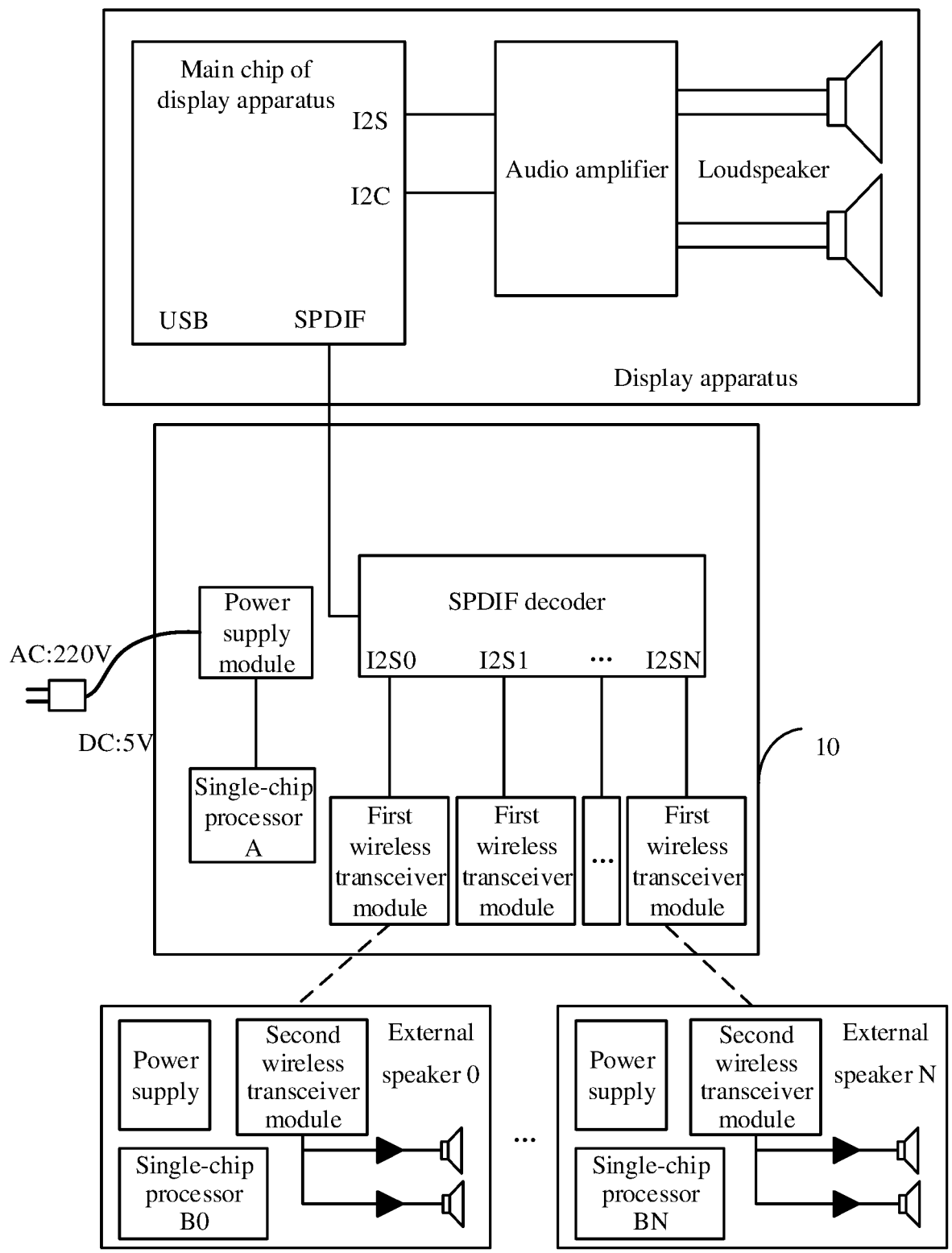

In some embodiments, as shown in FIG. 16, the first decoding module is an SPDIF decoder. The first channel signal is output through the SPDIF interface, and optionally the SPDIF is output in the PCM format, and the power is supplied by an external power adapter. If the first decoding module (SPDIF decoding chip) or the Soc of the display apparatus does not support the instruction transmission between each other in this case, only the Soc of the display apparatus may output the PCM signal to the SPDIF decoding chip unidirectionally. In this case, the wireless transmitting device does not communicate with the display apparatus through the USB interface. In order to automatically identify the type of wireless transmitting device and automatically switch the working mode, an option "built-in speaker and external speaker are used as sound output devices at the same time" may be added to the software menu of the display apparatus, which may be implemented by the user's selection.

In some embodiments, the first processing module does not communicate with the display apparatus, and the first connection terminal is only used to take power from the first output terminal of the display apparatus.

Figure 17:
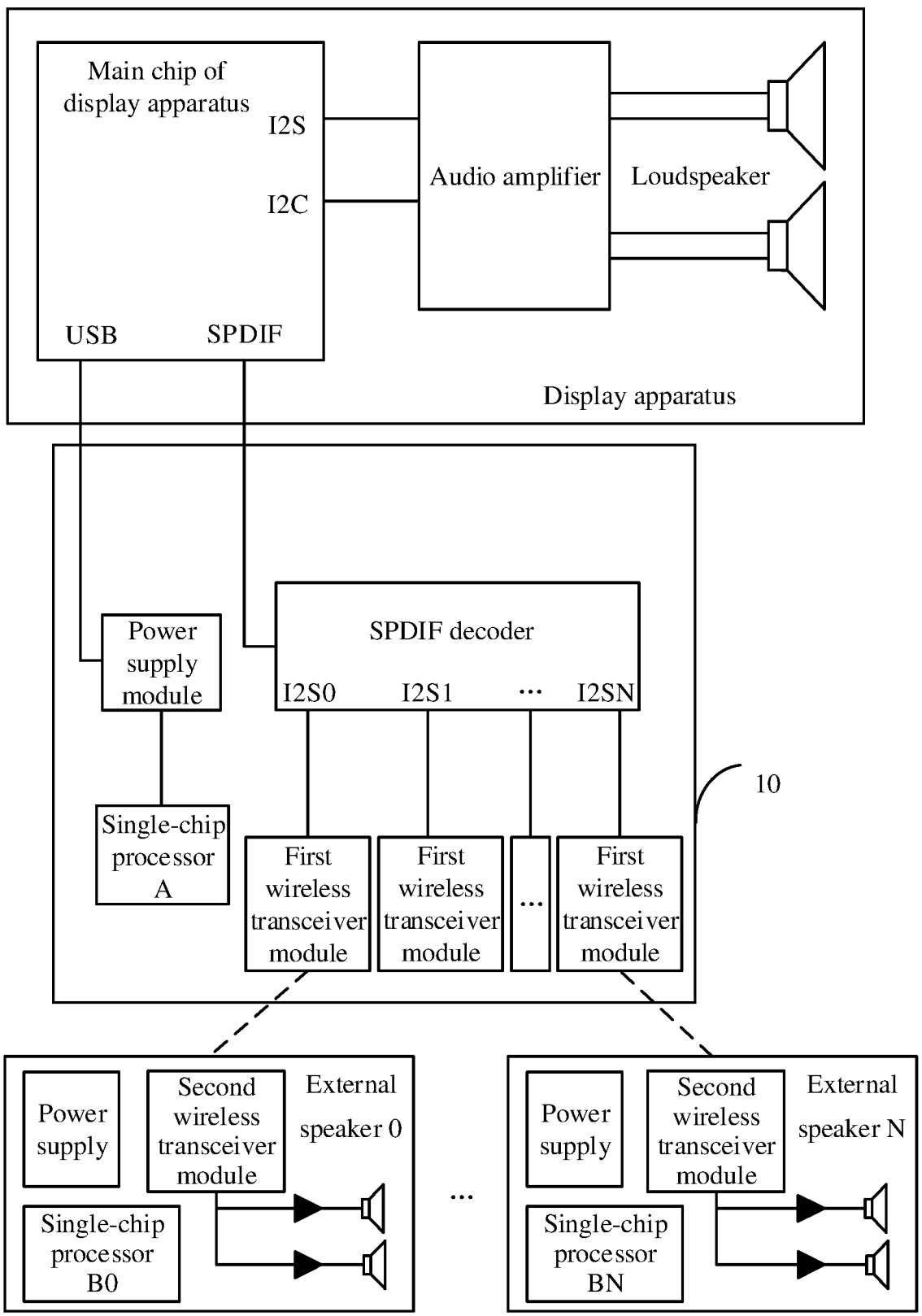

In some embodiments, as shown in FIG. 17, the power supply module is connected with the USB interface of the display apparatus (display apparatus) through the first connection terminal to get power. The first processing module is not connected with the display apparatus, and does not report the system information of the wireless transmitting device. The USB interface of the display apparatus is just used as a power source. The identification of the type of the wireless transmitting device may be: when the SPDIF insertion is detected and an unknown type of USB insertion is detected, it is determined that the wireless transmitting device accesses, and the decoder, the audio driver and the like of the display apparatus are set to cause the display apparatus to enter a corresponding working mode.

In some embodiments, the first processing module, the power supply module and the wireless transceiver module in the wireless transmitting device may be configured in one or more chips, which may be set according to actual requirements.

Figure 18:
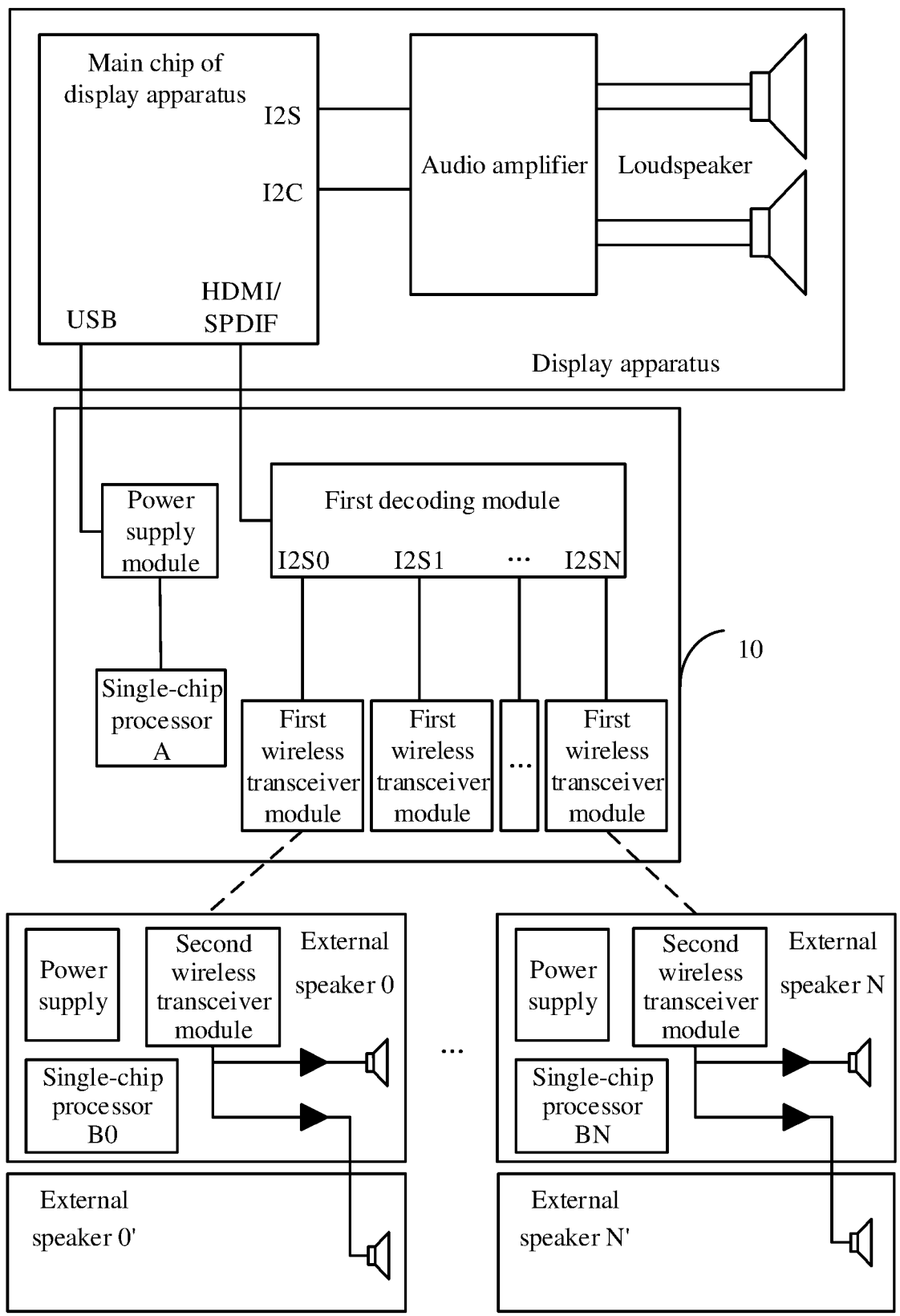

In some embodiments, as shown in FIG. 18, each external speaker (or each group of external speakers) includes two speakers, for example, external speaker 0 and external speaker 0', external speaker 1 and external speaker 1', external speaker N and external speaker N'. Taking the external speaker 0 and external speaker 0' as an example, the external speaker 0 has a loudspeaker, a second wireless transceiver module, a power supply, a single-chip processor and audio power amplifiers, where one of the audio power amplifiers is connected with the loudspeaker of the external speaker 0, and the other audio power amplifier outputs to the external speaker 0' through a circuit connection line; and there is only a loudspeaker in the external speaker 0'. The playing effect is further enhanced by playing through each group of two external speakers.

Figure 19:
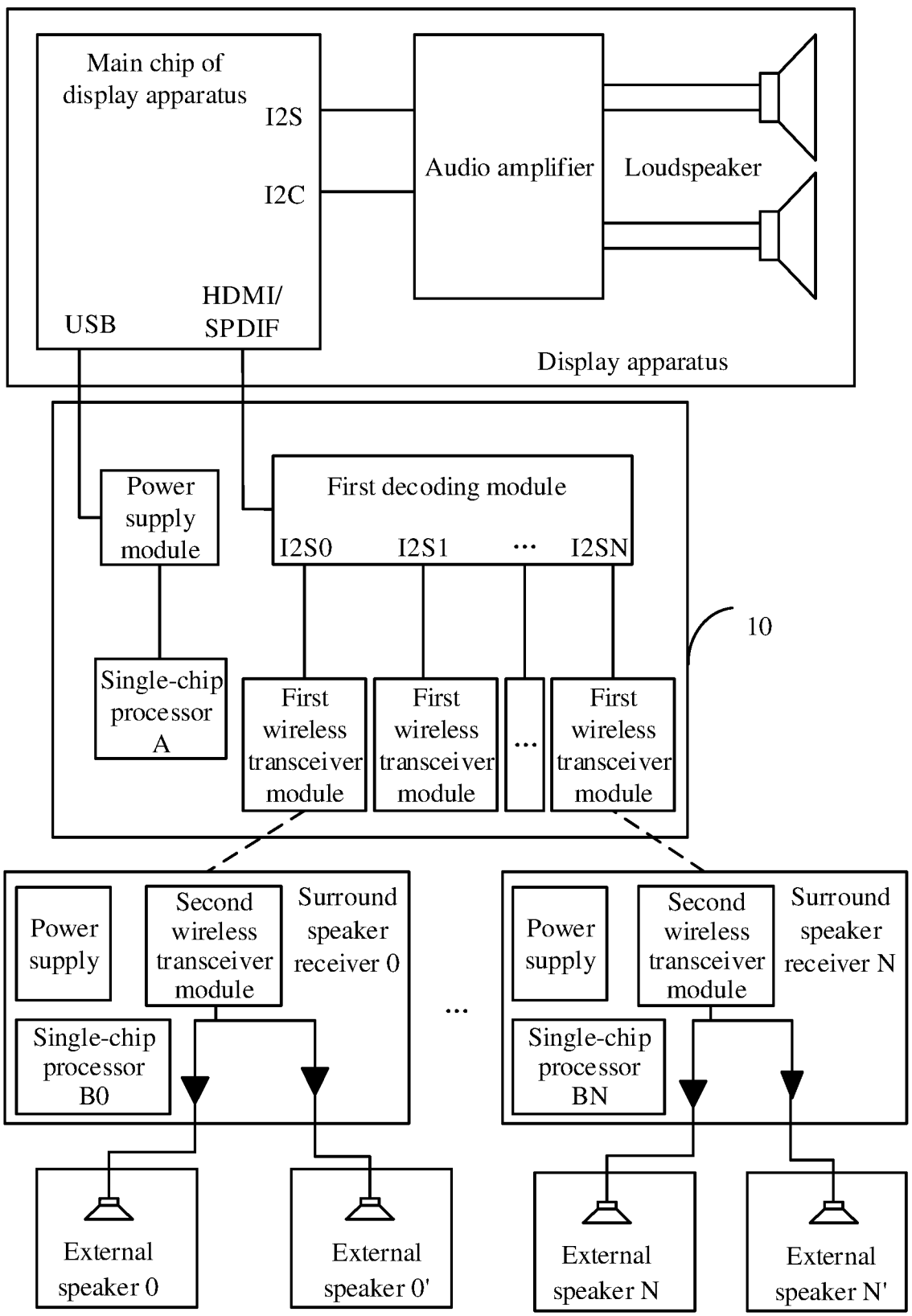

In some embodiments, as shown in FIG. 19, each group of external speakers includes an independent surround speaker receiver and two external speakers. The surround speaker receiver includes a power supply, a single-chip processor, a second wireless transceiver module and audio power amplifiers. The surround speaker receiver has two circuit outputs, which are respectively connected with two external speakers. The two external speakers are both passive speakers, that is, there are only a loudspeaker and acoustic devices and no circuit devices in each external speaker.

In the wireless transmitting device according to these embodiments, the power supply module supplies power to the first processing module, the first decoding module and each first wireless transceiver module; the first processing module communicates with the display apparatus to enable the display apparatus to identify the access of the wireless transmitting device; and the first decoding module receives the first channel signal sent by the display apparatus and decodes the first channel signal into channel sub-signals corresponding to channels. The channel sub-signals that cannot be played by the display apparatus may be sent to the paired external speaker for playback through the first wireless transceiver module, and the built-in speaker of the display apparatus plays other channel sub-signals, thus realizing the external expansion for the external speaker in connection with the display apparatus. Not only does the architecture of the display apparatus not need to be transformed, but also it may be convenient to realize the compatibility with various display apparatus platforms, effectively mitigating noise and staccat issues due to packet loss caused by USB delay timeout in related art.

Some embodiments of the disclosure provide an audio output control method, which is used to control the operation of the wireless transmitting device, to achieve the effect of stereo surround sound. The embodiments can be performed by the wireless transmitting device. The method includes following steps.

Step a201: receiving a first channel signal sent by a display apparatus, where the first channel signal includes audio signals of two or more channels.

Step a202: decoding the first channel signal into channel sub-signals corresponding to channels.

Step a203: sending channel sub-signals required to be played by an external speaker to a corresponding external speaker, so that the external speaker plays the channel sub-signals.

Here, for a scenario where the first channel signal is a multi-channel signal output by the eARC, only some channel sub-signals in the first channel signal need to be played by the external speaker, and the other channel sub-signals are sent by the display apparatus to the built-in speaker thereof for playback. For a scenario where the first channel signal is an SPDIF output signal, there are only channel sub-signals of two channels in the first channel signal, both of which need to be played by the external speaker, so each channel sub-signal is sent to the corresponding external speaker. Specific operations of the above steps may refer to the embodiments of the wireless transmitting device, and will not be repeated here.

In some embodiments, before receiving the first channel signal sent by the display apparatus, the method further includes: sending system information to the display apparatus through a first connection terminal after insertion into the display apparatus and completing power-on and initialization, to cause the display apparatus to identify a type of the wireless transmitting device.

Only when recognizing that the inserted wireless transmitting device is of a type of the wireless transmitting device according to the embodiments of the disclosure, the display apparatus may enable a I2S interface connected with the built-in speaker and a second output terminal (such as eARC interface) for extending the external speaker to output multi-channel signals at the same time, so that the built-in speaker and external speaker may play together to achieve the stereo surround sound effect. Here, the system information may include a model of the first processing module of the wireless transmitting device, a model of the first decoder, a model of the first wireless transceiver module, a quantity of external speakers configured, a type of each external speaker, and other related information. After receiving the system information, the display apparatus determines the type of the wireless transmitting device according to the system information. If it is determined that the type of the inserted wireless transmitting device is the preset type, the display apparatus controls the decoder, audio driver, DSP and other related modules in the display apparatus to enter the corresponding multi-channel mode, and controls the working state of the audio driver to the dual-output interface working state. Thus, when there is a sound signal to be played, the display apparatus may decode the sound signal to be played into a multi-channel signal, distribute some channel sub-signals to the built-in speaker according to the configuration of the built-in speaker, and send the multi-channel signal to the wireless transmitting device, so that the wireless transmitting device distributes other channel sub-signals to the external speaker.

In some embodiments, a table of a corresponding relationship among the type of the display apparatus, the type of the external speaker, the configuration of the display apparatus, the configuration of the external speaker and the configuration of the built-in speaker of the display apparatus may be preset and stored in the display apparatus and the wireless transmitting device. After the wireless transmitting device accesses to the display apparatus, the wireless transmitting device reports the system information thereof to the display apparatus, and the display apparatus may determine the working modes of the built-in speaker of the display apparatus and the first decoding module in the wireless transmitting device according to the table of the corresponding relationship. Interconnection and compatibility of devices may be realized through the table of the corresponding relationship, to improve versatility among the wireless transmitting device, the display apparatus and the speaker.

In some embodiments, the display apparatus is taken as an example, as shown in Table 1, which is an example of the table of the corresponding relationship of the display apparatus. The above is just an illustration, and the specific table is not limited to the content in Table 1. There may be more types of corresponding relationships, which may be set according to actual requirements.

TABLE 1

| Type of display apparatus | Type of external speaker | Decoder and DSP configuration of display apparatus | Built-in speaker of display apparatus | Configuration of external speaker |
|---|---|---|---|---|
| stereo | 4.1.2 | 5.1.2 | left channel speaker = center channel<br>right channel speaker = center channel | left front speaker = left channel + left height channel<br>right front speaker = right channel + right height channel<br>left rear speaker = left rear channel + left height channel<br>right rear speaker = right rear channel + right height channel<br>subwoofer speaker = subwoofer |
|  | stereo | 4.0.0 | left channel speaker = left channel<br>right channel speaker = right channel | left rear speaker = left rear channel<br>right rear speaker = right rear channel |
| 3.1.2 | stereo + height | 5.1.2 | left channel speaker = left channel<br>right channel speaker = right channel<br>center channel speaker = center channel<br>left height speaker = left height effect<br>right height speaker = right height effect<br>subwoofer speaker = subwoofer | left rear speaker = left rear channel + left height channel<br>right rear speaker = right rear channel + right height channel |
|  | 4.1.2 | 5.1.2 | left channel speaker = center channel<br>right channel speaker = center channel<br>center channel speaker = center channel | left front speaker = left channel + left height channel<br>right front speaker = right channel + right height channel<br>left rear speaker = left rear channel + left height channel<br>right rear speaker = right rear channel + right height channel<br>subwoofer speaker = subwoofer |

In some embodiments, only the second connection terminal of the wireless transmission device is inserted into the display apparatus and completes power-on and initialization, and the first connection terminal is inserted into an external power adapter to get power. The specific control in this case has been discussed in detail in above embodiments and will not be repeated here.

In the audio output control method according to the embodiments, the first channel signal sent by the display apparatus is received, and the first channel signal is decoded into the channel sub-signals corresponding to the channels; and the channel sub-signals required to be played by external speakers are sent to the corresponding external speakers, to cause the external speakers to play respective channel sub-signals, so that the external speakers may work in cooperation with the built-in speaker of the display apparatus, to achieve the effect of stereo surround sound without the need to modify the architecture of the display apparatus, also conveniently realize the compatibility with various display apparatus platforms, and significantly reducing noise and staccato due to packet loss caused by USB delay timeout in related art.

Another embodiment of the disclosure provides an audio output control method, which is used to control the display apparatus and thus control the operation of the wireless transmitting device, to realize the effect of stereo surround sound. The embodiments can be performed by the display apparatus, and the method includes following steps.

Step a301: when determining that a preset type of wireless transmitting device accesses, controlling the display apparatus to work in a dual-output signal state.

Step a302: when there is a sound signal to be played, decoding the sound signal to be played into a multi-channel signal.

Step a303: sending some channel sub-signals in the multi-channel signal respectively to a built-in speaker in the display apparatus for playback.

Step a304: sending the multi-channel signal as a first channel signal to a wireless transmitting device, so that the wireless transmitting device sends other channel sub-signals in the multi-channel signal to an external speaker for playback; or, sending other channel sub-signals in the multi-channel signal as a first channel signal to the wireless transmitting device, so that the wireless transmitting device sends the received channel sub-signals to the external speaker for playback. It should be noted that the step a303 and step a304 can be performed in order or in no particular order.

When determining that a preset type of wireless transmission device accesses, the display apparatus is to switch into a multi-channel mode by configuring the second decoding module of the display apparatus to enter the multi-channel output mode (for example, the display apparatus is in the stereo output mode before the wireless transmitting device is inserted, and is configured as 5.1.2 output after insertion), and correspondingly configuring the DSP inside the display apparatus to work in the multi-channel mode. There is also a need to control the audio driver of the display apparatus to work in the dual-output signal state, that is, the output of the built-in I2S and the output of the external second output terminal (HDMI or SPDIF). And both output signals are multi-channel signals. For example, the eARC interface of the display apparatus outputs the 5.1.2 multi-channel signal decoded by the second decoding module of the display apparatus to the wireless transmitting device, and then the wireless transmitting device redistributes some channel sub-signals to the external speaker, while the output of the I2S of the display apparatus is selective output according to the configuration of the built-in speaker of the display apparatus. For example, the center channel signal is selected to be output at the I2S through MUX, and the left and right channels of the I2S are both selected to output the center channel signal, so that the built-in speaker of the display apparatus acts as a center speaker.

In some embodiments, before controlling the display apparatus to change the working mode, it can determine whether there is an audio playing task currently. If there is an audio playing task now, it is necessary to interrupt the playing task, resume the playing task until the working mode is switched successfully, and decode the sound signal to be played in the playing task into a multi-channel signal. The built-in speaker and the external speaker works together to realize playing in the multi-channel working mode and achieve the effect of stereo surround sound.

In the audio output control method according to the above embodiments, when the display apparatus recognizes that a preset type of wireless transmitting device is inserted, the working mode of the display apparatus is caused to enter the multi-channel mode or SPDIF mode, and the audio driver works in the dual-output signal state. When playing, the sound signal to be played may be decoded into a multi-channel signal, some channel sub-signals in the multi-channel signal are played by the built-in speaker, and other channel sub-signals in the multi-channel signal are played by the external speaker, so that the external speaker may work in cooperation with the built-in speaker of the display apparatus, to achieve the effect of stereo surround sound without the need to modify the architecture of the display apparatus, also conveniently realize the compatibility with various display apparatus platforms, and effectively reduce noise and staccato due to packet loss caused by USB delay timeout in related art.

In some embodiments, the method further includes following steps.

Step a4011: obtaining system information of a wireless transmitting device when recognizing that the wireless transmitting device is inserted.

Step a4012: determining whether the type of the inserted wireless transmitting device is a preset type according to the system information.

The wireless transmitting device may work normally only when both connection terminals are inserted into the display apparatus. The insertion process may have two sequences, which have been described in detail in the above embodiments and will not be repeated here. When the display apparatus recognizes that a wireless transmitting device is inserted, the display apparatus may obtain the system information from the wireless transmitting device through the first output terminal, determine the type of the wireless transmitting device according to the system information, and determine working modes of the built-in speaker in the display apparatus and the first decoding module in the wireless transmitting device according to the pre-stored truth table of the corresponding relationship.

In some embodiments, the method further includes a following step.

Step a4021: when detecting that a device is inserted into the second output terminal and detecting that an unknown type of device is inserted into the first output terminal, determining that a preset type of wireless transmitting device is inserted. That is, the first output terminal is only used to supply power to the wireless transmitting device, and the specific description refers to the above-mentioned embodiments.

In some embodiments, the method further includes a following step.

Step a4031: when detecting that a device is inserted into the second output terminal, determining the type of the inserted wireless transmitting device through the handshake protocol. If only the HDMI interface is inserted, an external power adapter supplies power, and the specific description refers to the above-mentioned embodiments.

In some embodiments, the method further includes following steps.

Step a4041: when detecting that a device is inserted into the second output terminal, presenting an option of dual-audio output device.

Step a4042: if a confirmation command from the user is received, determining that the inserted device is a preset type of wireless transmission device.

If only the SPDIF interface is inserted, an external power adapter supplies power, and the specific description refers to the above-mentioned embodiments. The dual-sound output device means that the built-in speaker and external speaker are used as sound output devices at the same time.

In some embodiments, after determining whether the inserted device is a preset type of wireless transmitting device according to the system information, the method further includes: if the inserted device is the preset type of wireless transmitting device, determining whether there is currently a sound signal to be played; and if there is currently the sound signal to be played, interrupting the playing.

Before controlling the display apparatus to change the working mode, it may determine whether there is an audio playing task currently ongoing. If there is an audio playing task ongoing, it is necessary to interrupt the playing task, resume the playing task until the working mode is switched successfully, and decode the sound signal to be played in the playing task into a multi-channel signal. The built-in speaker and the external speaker cooperate to realize playing in the multi-channel working mode and achieve the effect of stereo surround sound.

In some embodiments, the method further includes: controlling first delay time of the I2S interface corresponding to the built-in speaker and second delay time of the multi-channel signal, so that the time difference between the sound from the built-in speaker and the sound from the external speaker is within a preset threshold range.

In some embodiments, there is a delay in wireless transmission, and the I2S delay is negligible, so the case that the built-in loudspeaker (that is, the built-in speaker) of the display apparatus emits sound earlier than the surround sound speaker (that is, the external speaker) may occur. To avoid this scenario, a delay synchronization mechanism may be set. Since the duration required by the display apparatus to process the picture (such as the image quality improvement algorithm) is longer than the duration for processing the sound signal, most of the current display apparatuses have delayed the sound in order to maintain the sound and picture synchronization. For example, the delay of this audio system is Mms. It is assumed that the surround sound speaker emits sound Nms later than the built-in speaker of the display apparatus. Before accessing the dongle (that is, the wireless transmitting device), the system delay of the sound signal is Mms; and the delay becomes (M−N) ms after the access. Meanwhile, the delay of the I2S interface (the I2S of Soc of some display apparatuses has a delay module, and the setting is performed by the audio amplifier for the Soc with no delay module) is set from 0 ms to Nms. If the delay of the surround sound speaker is too long, that is, N>M, the pictures of the display apparatus cannot be cached, so the system delay may only be reduced to 0 ms. In this case, in order to ensure the users listening experience, the delay of the surround sound speaker is required to be no more than 150 ms, that is, N-M is less than 150 ms when N>M. When this condition is not met, a wireless module solution with lower delay should be selected. The first delay time of the I2S interface corresponding to the built-in speaker and the second delay time of the multi-channel signal are controlled according to the above principle, so that the time difference between the sound from the built-in speaker and the sound from the external speaker is within the preset threshold range, thereby improving the users listening experience.

In some embodiments, recognizing the insertion of the wireless transmitting device includes: after detecting that the first connection terminal is inserted into the first output terminal, if it is detected that the second connection terminal has been inserted into the second output terminal, then determining that the wireless transmitting device is inserted; or, after detecting that the first connection terminal is inserted into the first output terminal, if it is detected that the second connection terminal is not inserted into the second output terminal, then determining that the wireless transmitting device is inserted after waiting for the second connection terminal to be inserted. Different processings of the display apparatus in different insertion sequences have been described in detail in the above-mentioned embodiments, and will not be repeated here.

In some embodiments, after the wireless transmitting device is inserted and works, the display apparatus may also monitor unplugging of the wireless transmitting device in real time or regularly, and control the working mode of each component of the display apparatus to return to the state when the wireless transmitting device is not inserted after detecting the unplugging. The details will not be repeated here.

In the audio output control method according to the above embodiments, when the display apparatus recognizes that a preset type of wireless transmitting device is inserted, the working mode of the display apparatus is caused to enter into the multi-channel mode or SPDIF mode, and the audio driver works in the dual-output signal state. When playing, the sound signal to be played may be decoded into a multi-channel signal, some channel sub-signals in the multi-channel signal are played by the built-in speaker, and other channel sub-signals in the multi-channel signal are played by the external speaker, so that the external speaker may work in cooperation with the built-in speaker of the display apparatus, to achieve the effect of stereo surround sound without the need to modify the architecture of the display apparatus, also conveniently realize the compatibility with various display apparatus platforms, and effectively reduce noise and staccato issues due to packet loss caused by USB delay timeout in related art. Also, the synchronization of sound playback between the built-in speaker and the external speaker may be effectively controlled through the delay control, further improving the user's listening experience.

Some embodiments of the disclosure discuss a control process of the display apparatus on the wireless transmitting device. The first decoding module takes the eARC decoder as an example, the first connection terminal takes the USB interface as an example, the second connection terminal takes the eARC interface as an example, and the first processing module takes a single-chip processor as an example. The specific process is as follows.

1. The dongle (that is, the wireless transmitting device, the same below) is inserted into the display apparatus. There are two insertion sequences: one insertion sequence is to insert the eARC interface first, and then insert the USB interface. When the eARC interface is inserted first, the dongle circuit is not powered, so the eARC decoder is in the unloaded state, and the Soc of the display apparatus may not identify the insertion of the dongle. When the USB interface is inserted, the dongle circuit is powered, the eARC decoder and the single-chip processor are both in the working state, and the Soc of the display apparatus may identify the insertion of the dongle. The other insertion sequence is to insert the USB interface first, the single-chip processor may work, and the display apparatus identifies the access of the dongle, and in this case, the Soc of the display apparatus may wait for the insertion of the eARC interface.

2. When the dongle is inserted, the Soc of the display apparatus may communicate with the single-chip processor of the dongle to identify the type of the inserted device. The system information on the dongle is read, including the model of the single-chip processor, the model of the eARC decoder, the model of the first wireless transceiver module, the quantity of surround speakers configured in the dongle, and the type of surround speakers, etc.

3. If the display apparatus has a playing task currently ongoing, the playing task is required to be paused.

4. The Soc of the display apparatus enters into the multi-channel output mode by configuring the decoder (that is, the second decoding module of the display apparatus) (for example, the display apparatus is in the stereo output mode before the dongle is inserted, and is set as 5.1.2 output after insertion), and correspondingly configures the DSP inside the Soc of the display apparatus to work in the multi-channel mode. Also, the audio driver of the Soc of the display apparatus is reset to work in the state of dual device output signals (i.e., I2S output signal and eARC output signal) (for example, only the I2S has output before insertion; and if the eARC device other than the dongle of this embodiment is inserted, only the eARC has output, and the I2S has no output). The dual device output signals are both set as multi-channel signals, where the eARC outputs the decoded 5.1.2 multi-channel signal, and the I2S selectively outputs according to the loudspeaker configuration of the display apparatus (in this embodiment, the center channel signal is selected to be output at the I2S, and the left and right channels of the I2S are both selected to output the center channel output).

5. Delay is controlled to reduce the delay time of the audio signal and increase the delay time of the output of the I2S interface.

6. The playing task is resumed.

7. The control process is completed, and it is detected that the dongle is unplugged.

Corresponding to the display apparatus, the control process of the dongle is as follows.

1. The dongle is powered on and completes initialization of each module after insertion into the display apparatus.

2. The dongle communicates with the display apparatus via the USB interface and reports the system information.

3. The dongle sets the working mode corresponding to the eARC (i.e., the first decoding module, which is an eARC decoder here) (in this embodiment, the eARC decoder receives 5.1.2-channel signal transmitted from the display apparatus, and may decode this signal into 8 independent digital audio signals (that is, channel sub-signals), the 8 independent digital audio signals are left channel signal, right channel signal, center channel signal, left rear surround channel signal, right rear surround channel signal, subwoofer channel signal, left height channel signal and right height channel signal respectively. Since the built-in loudspeaker of the display apparatus plays the center channel, the eARC decoder redistributes the remaining seven signals, in which the left and left height channel signals are output by I2S0, the right and right height channel signals are output by I2S1, the left rear and left height channel are output by I2S2, the right rear and right height channel signals are output by I2S3, and the subwoofer channel signal is output by I2S4.

For the convenience of explanation, the above description has been made in combination with specific embodiments. However, the above discussion in some embodiments is not intended to be exhaustive or to limit embodiments to the specific forms disclosed above. Numerous modifications and variations may be obtained in light of the above teachings. Embodiments are chosen and described in order to better explain the principles and practical applications, to enable those skilled in the art to better utilize embodiments and various variant embodiments suitable for specific use considerations.

What is claimed is:
1. A display apparatus, comprising:
  a display configured to display an image from a broadcast system or Internet and/or a user interface;
  an input interface configured to connect with an external device and comprising a HDMI port, wherein the external device comprises one or more types of power amplifier device;
  a processor in connection with the display and the input interface and configured to:
  upon detecting access of a first power amplifier device, output a high-level Hotplug signal at a Hotplug port of the display apparatus, wherein the first power amplifier device comprises: a power amplifier device that supports e-ARC function or a power amplifier device that supports ARC function;
  monitor whether a common-mode data packet from the first power amplifier device is received within a first preset duration;
  in response to the common-mode data packet being received within the first preset duration, send a heartbeat packet to the first power amplifier device, and monitor whether a heartbeat response as a reply to the heartbeat packet sent from the first power amplifier device is received within a second preset duration after sending the heartbeat packet;
  in response to the heartbeat response from the first power amplifier device being received within the second preset duration, determine that the first power amplifier device is a power amplifier device that supports e-ARC function; and
  in response to the heartbeat response from the first power amplifier device being not received within the second preset duration, determine that the first power amplifier device is a power amplifier device that supports ARC function.

2. The display apparatus according to claim 1, wherein the processor is further configured to:
  in response to the heartbeat response from the first power amplifier device being not received within the second preset duration, send a first instruction for indicating setting a sound system working mode of the first power amplifier device to the first power amplifier device to cause the first power amplifier to switch to the sound system working mode from a standby state.

3. The display apparatus according to claim 2, wherein the processor is further configured to:
monitor whether a first response as a reply to the first instruction sent from the first power amplifier device is received within a third preset duration;
in response to the first response being received within the third preset duration, send a second instruction for indicating report of the setting of the sound system working mode to the first power amplifier device.

4. The display apparatus according to claim 3, wherein the processor is further configured to:
monitor whether a second response as a reply to the second instruction sent from the first power amplifier device is received within a fourth preset duration;
in response to the second response being received within the fourth preset duration, establish a communication connection with the first power amplifier device.

5. The display apparatus according to claim 1, wherein the processor is further configured to:
in response to the common-mode data packet being not received within the first preset duration, send a third instruction for indicating waking up the first power amplifier device from a standby state and starting a sound system working mode to the first power amplifier device.

6. The display apparatus according to claim 5, wherein the processor is further configured to:
monitor whether a third response as a reply to the third instruction is received within a fifth preset duration;
in response to the third response being received within the fifth preset duration, send a fourth instruction for indicating report of setting of the sound system working mode to the first power amplifier device.

7. The display apparatus according to claim 6, wherein the processor is further configured to:
monitor whether a fourth response as a reply to the fourth instruction sent from the first power amplifier device is received within a sixth preset duration;
in response to the fourth response being received within the sixth preset duration, establish a communication connection with the first power amplifier device.

8. The display apparatus according to claim 1, wherein the common-mode data packet comprises a Mode Data packet.

9. The display apparatus according to claim 1, wherein the first power amplifier is an external speaker.

10. The display apparatus according to claim 1, wherein the first power amplifier is connected with the display apparatus via a HDMI port.

11. A method for determining a power amplifier device in a display apparatus, comprising:
upon detecting access of a first power amplifier device to the display apparatus, outputting a high-level Hotplug signal at a Hotplug port of the display apparatus, wherein the first power amplifier device comprises: a power amplifier device that supports e-ARC function or a power amplifier device that supports ARC function;
monitoring whether a common-mode data packet from the first power amplifier device is received within a first preset duration;
in response to the common-mode data packet being received within the first preset duration, sending a heartbeat packet to the first power amplifier device, and monitoring whether a heartbeat response as a reply to the heartbeat packet sent from the first power amplifier device is received within a second preset duration after sending the heartbeat packet;
in response to the heartbeat response from the first power amplifier device being received within the second preset duration, determining that the first power amplifier device is a power amplifier device that supports e-ARC function; and
in response to the heartbeat response from the first power amplifier device being not received within the second preset duration, determining that the first power amplifier device is a power amplifier device that supports ARC function.

12. The method according to claim 11, wherein the method further comprises:
in response to the heartbeat response from the first power amplifier device being not received within the second preset duration, sending a first instruction for indicating setting a sound system working mode of the first power amplifier device to the first power amplifier device to cause the first power amplifier to switch to the sound system working mode from a standby state.

13. The method according to claim 12, wherein the method further comprises:
monitoring whether a first response as a reply to the first instruction sent from the first power amplifier device is received within a third preset duration;
in response to the first response being received within the third preset duration, sending a second instruction for indicating report of the setting of the sound system working mode to the first power amplifier device.

14. The method according to claim 13, wherein the method further comprises:
monitoring whether a second response as a reply to the second instruction sent from the first power amplifier device is received within a fourth preset duration;
in response to the second response being received within the fourth preset duration, establishing a communication connection with the first power amplifier device.

15. The method according to claim 11, wherein the method further comprises:
in response to the common-mode data packet being not received within the first preset duration, sending a third instruction for indicating waking up the first power amplifier device from a standby state and starting a sound system working mode to the first power amplifier device.

16. The method according to claim 15, wherein the method further comprises:
monitoring whether a third response as a reply to the third instruction is received within a fifth preset duration;
in response to the third response being received within the fifth preset duration, sending a fourth instruction for indicating report of setting of the sound system working mode to the first power amplifier device.

17. The method according to claim 16, wherein the method further comprises:
monitoring whether a fourth response as a reply to the fourth instruction sent from the first power amplifier device is received within a sixth preset duration;
in response to the fourth response being received within the sixth preset duration, establishing a communication connection with the first power amplifier device.

18. The method according to claim 11, wherein the common-mode data packet comprises a Mode Data packet.

19. The method according to claim 11, wherein the first power amplifier is an external speaker.

20. The method according to claim 11, wherein the first power amplifier is connected with the display apparatus via a HDMI port.

* * * * *